*INVENTORS*
SOLOMON H. PITT
EDWARD SHERBERT
FLOYD E. ROSS
*BY* Sheldon Kapustin
*ATTORNEY*

July 2, 1968 S. H. PITT ET AL 3,390,630

HIGH SPEED PRINTING DEVICE EMPLOYING BAR PRINTER AND DOUBLE WIDTH HAMMERS

Filed June 9, 1966 9 Sheets-Sheet 2

SPROCKET DETECTOR & CONTROL FF'S

United States Patent Office 3,390,630

Patented July 2, 1968

3,390,630
HIGH SPEED PRINTING DEVICE EMPLOYING BAR PRINTER AND DOUBLE WIDTH HAMMERS

Solomon H. Pitt, Norristown, Edward Sherbert, Plymouth Meeting, and Floyd E. Ross, Warminster, Pa., assignors to Sperry Rand Corporation, New York, N.Y., a corporation of Delaware Filed June 9, 1966, Ser. No. 556,370
8 Claims. (Cl. 101—93)

ABSTRACT OF THE DISCLOSURE

This invention relates to a bar printer with double width hammers. The printer operates with a plurality of different print bars; e.g. a 64 character bar and 48/16 character bar. The first of these bars contains two complete fonts of 64 characters each. When printing a line with this bar, the characters to be printed in the odd columns are printed when the bar is swinging left and the characters for the even columns are printed when the bar swings right.

The second of these print bars contains two 48 character fonts (including numerics). The two bars are the same length and the characters on the bars are the same size and are similarly displaced from each other in both bars. The second bar contains two extra sets of numeric fonts. These extra sets of numeric characters are displaced one column position in relation to the 48 character font so that when the numerics in the 48 character font line up with the even columns on the record the numerics in the extra font line up in the odd column and vice versa. If only numerics are to be printed, then an entire line can be printed in one sweep of the bar (either right or left). It should be noted that the second bar can still print alpha-numerics and in this mode an entire line is printed only after the bar has been moved in both directions. In the alpha-numeric mode the extra numeric fonts are not used.

This invention relates to an improved form of electronically controlled high speed printing device employing a print bar or band carrying type fonts wherein the print bar or band moves in a direction traverse to the direction of movement of a print receiving record. It is particularly applicable to such printing devices which employ a plurality of printing hammers, each of which spans at least two columns of the record. Although the specification that follows describes a printing device employing a print bar, it will be understood that certain aspects of the description are applicable to print devices employing a print band.

The printing device described herein may be used with a plurality of different print bars. A first or standard print bar may be used which carries at least two full sets of type characters along the length thereof. Each full set of type characters, or a font, comprises N character types. That is, the full font may comprise twenty-six alphabetic characters, ten numerals and additional punctuation and symbol characters. On this first print bar the pitch of the type and the placement thereof is such that all the type, at particular times, either lines up with the odd or even columns of the record. That is, the type on the bar is positioned so that there is one character space between each of the character types. In operation, when this first bar is employed, all the characters of the message which are to be printed in even columns of the record are printed before the characters of the message to be printed in the odd columns of the record or vice-versa. It will be appreciated that when a bar is used to carry the type, the bar oscillates and moves across the paper first in one direction and then the other. When the first bar is used, the characters of the message to be printed in the even columns of the record are printed as the bar moves in a first direction and the characters to be printed in odd columns of the record are printed as the bar moves in a second direction. Thus, a complete line of printing requires that this first bar traverse its full cycle and move to and fro across the record.

The printing device described in this invention may also accommodate other print bars having different fonts. When a second bar is used, it must physically replace the first print bar just described, although the electronic circuitry controlling the print device remains substantially the same for either bar. The second bar also carries at least two fonts. In the particular apparatus described the font on the second bar also comprises a plurality of characters although it is not necessary that the font on the second bar comprise the same number of characters as the font on the first bar. As shall be seen, some of the character types within a type set or font on the second bar are repeated so that the total number of different characters in the font of the second bar is less than the number of characters comprising the font of the first bar.

The font on the second bar is made up of two portions. The first portion of this font may comprise the twenty-six alphabetic characters, the ten numerals 0–9 and selected ones of the punctuation and symbol characters of the first bar. The punctuation and symbol characters selected for the second bar should be the ones most frequently used in printing. The second portion of the font may include the same ten numerals and some of the punctuation and symbol characters used in the first portion of the font. On the second bar the pitch of the type in the first portion of the font and the placement thereof is such that all the type, at particular times, either lines up with the odd or even columns of the record. The same is true for the character types in the second portion of the font. However, the two portions of the font are positioned on the bar so that when the character types of the first portion line up with the even columns of the record, the character types of the second portion of the font line up with the odd columns of the record and vice versa. Accordingly, it may be noted that the character types of the second portion of the font are offset with regard to the character types in the first portion of the font. The type in both portions of the font is again positioned so that there is one character space between each of the type faces.

When the second or offset bar is used, two modes of operation are possible. In a first mode, the repeated set of characters comprising the numerals etc. in the second or offset portion of the font is not used and the operation of the printing device is substantially the same as that briefly described in connection with the first bar. That is, to print an entire line the bar must go through its complete cycle. When the printer is operated in this first mode, with the second bar, the entire alphabet may be printed as well as all the numerals and a portion of the punctuation and symbol characters present on the first bar. The printing speed using the first bar and the second bar in this mode of operation is the same.

In the second mode of operation the character types from the offset portion of the font are used with the same character types (i.e., the numerals and some portion of the punctuation and symbol characters) from the first portion of the font. In this mode of operation a limited set of characters comprising the numerals and punctuation marks etc. may be printed each time the bar crosses the record. That is, odd and even columns of a line on the record are printed as the bar moves in either direction. Consequently, in the second mode of operation employing the second bar the rate of printing lines on the record is increased by a factor of two.

When the second or offset bar is used, the choice of modes of operation may be determined by the setting of a mechanical or electronic switch. The setting of the mechanical switch may be controlled by an operator and the setting of the electronic switch may be controlled by an instruction from a computer.

The advantages in using the second bar are very significant. Further, the ability to change bars (i.e., use either the first or the second bar) without significantly changing the electronic circuitry controlling the printer is also quite significant. It is well known that many printing applications involve the printing of limited sets of characters such as numeric data. Previous printers have allowed for printing such limited sets of characters at increased rate only if the mechanism carrying the fonts were physically replaced with a special font carrier. To print a full set of characters the regular font carrier or bar would have to be reinstalled. Consequently, since even numeric data has alpha-numeric headings, the capability of printing such numeric data could not be practically utilized because constant changing of the bar is far too time consuming. This invention allows the selection under program control of certain sets of characters from the second bar. One set is essentially numeric, while the other set is alpha-numeric and includes the alphabet, the numeric characters and certain punctuation and special symbols. Characters from the numeric set are printed twice as fast as the characters from the alpha-numeric set. While the alpha-numeric set of characters on the second bar is usually sufficient for most printing applications, a bar having yet a larger font can be substituted in the printer of this invention when desired.

In order that the aforementioned print bars may be used for their intended purposes, suitable electronic apparatus and techniques must be employed to actuate the print hammers associated with the print bars in accordance with the message to be printed. Such apparatus includes a character addressable buffer memory. Each location in the memory stores a character of a line of the message to be printed. The first location in the buffer memory stores the character of the message to be printed in the first column of the record and the last location in the buffer memory stores the character to be printed in the last column of the record. Intermediate locations in the buffer memory correspond to intermediate columnar positions of the record. Additionally, apparatus is provided to compare in sequential order the contents of the buffer memory with representations of the type characters on the print bar. That is, the character stored in the first location of the memory to be printed is compared with the representation of the character type approaching the first column position of the record to have a character imprinted thereupon. Then the character in the second location in the memory is compared with a representation of the character type on the print bar approaching the second column of the record to have a character therein printed. This process goes on until each character type on the print bar is compared with the contents of a memory location. If there is agreement between the character of the message and the character on the type bar approaching a column position on the record where the character of the message should be printed, the print hammer associated with this column position is fired.

As the print bar moves, type thereon assumes a new relationship with respect to the column positions of the record. For every such new relationship, each of the representations of the character types on the bar must be compared with the contents of a different memory location, and print hammers must be fired in accordance with this comparison. This printing process goes on until a line of the record is printed, i.e., until every character in the font on the bar can be lined up for printing in every columnar position of the record. Depending on the bar employed and the mode of operation the above requirement is completed when the bar has gone through a full cycle of movement or a half of cycle.

In the embodiment of the invention described herein a parallel printing technique is employed; that is, the first character of the message is compared against the character on the bar approaching the first column of the record; a second character of the message is compared against the character on the bar approaching the second column of the record to be printed upon and so on, wherever agreement is found as these comparisons take place a record of the decision is kept. For example, if the second, tenth and sixteenth characters of the message are the same as the characters on the bar approaching the second, tenth and sixteenth columns on the record, decision storage elements associated with the print hammers for the second, tenth and sixteenth columns are actuated. In parallel printing one decision storage element is usually associated with each printing hammer. After all the characters of the message are read out of the buffer memory and each one is compared against the character from the printing bar, then printing takes place simultaneously (or in parallel) at all those column positions where agreement was found. Although the parallel printing technique is described this invention is applicable to bar printers and the like where the serial technique of printing is used; that is, where the decision storage elements are not employed and the individual print hammers are fired as soon as comparison takes place. Such a serial printing device is shown and described in copending application Ser. No. 548,584 filed by Solomon H. Pitt on May 9, 1966. This application issued as U.S. Patent 3,342,127, on Sept. 19, 1967.

In the specific embodiment described herein the print bar is moved traverse to the direction of the record motion. The hammer assembly is behind the record consisting of one print hammer, two columns wide for each two of the character spaces which may be printed in a line. Each print hammer is mounted in a position aligned with the interspace between two character spaces of the record and its hammer face is of sufficient width to span both of the adjacent character spaces. A single print hammer actuator is associated with each print hammer and is used to cause printing in either of the character spaces spanned by the print hammer. Individual character types are placed upon the print bar at character spaces corresponding to alternate character spaces upon the record.

The print bar has markers or sprockets upon it which are used to identify the characters on the print bar and their relationship to the record and to provide necessary timing pulses. The electronic apparatus controlling the printing operation comprises means which are responsive to the sprockets for producing coded representations of all the character types on the bar in an order related to their position with regard to the columns of the record. Further, means are provided for scanning a plurality of locations in the buffer memory after each sprocket pulse is detected. In particular, when the first bar is used all the odd numbered locations in the buffer memory are sequentially addressed after each sprocket pulse when the bar is going in a first direction and all the even locations in the buffer memory are sequentially addressed when the bar is going in a second direction. However, when the second bar is used, each time the memory is scanned a portion thereof must be scanned in even locations and a portion must be scanned in odd locations because printing may take place in both the odd and even columns of the record not withstanding the direction of the print bar movement.

The above described features and advantages of this invention will be pointed out in the following description and claims, and illustrated in the accompanying drawings which disclose by way of example the principles of this invention and means for carrying it out.

In the drawings:

FIGURE 1 illustrates a printing bar and the drive mechanism therefor. FIGURE 2 is an illustration of a first type of print bar used with the mechanism of FIGURE 1 and shows the relationship of the character types on the bar, the record and print hammers.

FIGURES 3*a* to 3*d* show details of the first print bar as well as various positions of the first print bar in relation to the record.

FIGURE 4 is a block diagram of the control apparatus responsive to sprockets on the print bar.

FIGURE 4*a* is a timing diagram illustrating waveforms of pulses produced in response to the sprockets on the bar.

FIGURE 5 is a more detailed block diagram of the cyclic counter shown in FIGURE 4.

FIGURES 6*a* and 6*b* taken together as shown in FIGURE 6 comprise a block diagram illustrating the interconnection of the registers storing the message to be printed and the apparatus for controlling the firing of the print hammers of FIGURE 2.

Figures 1, 2:
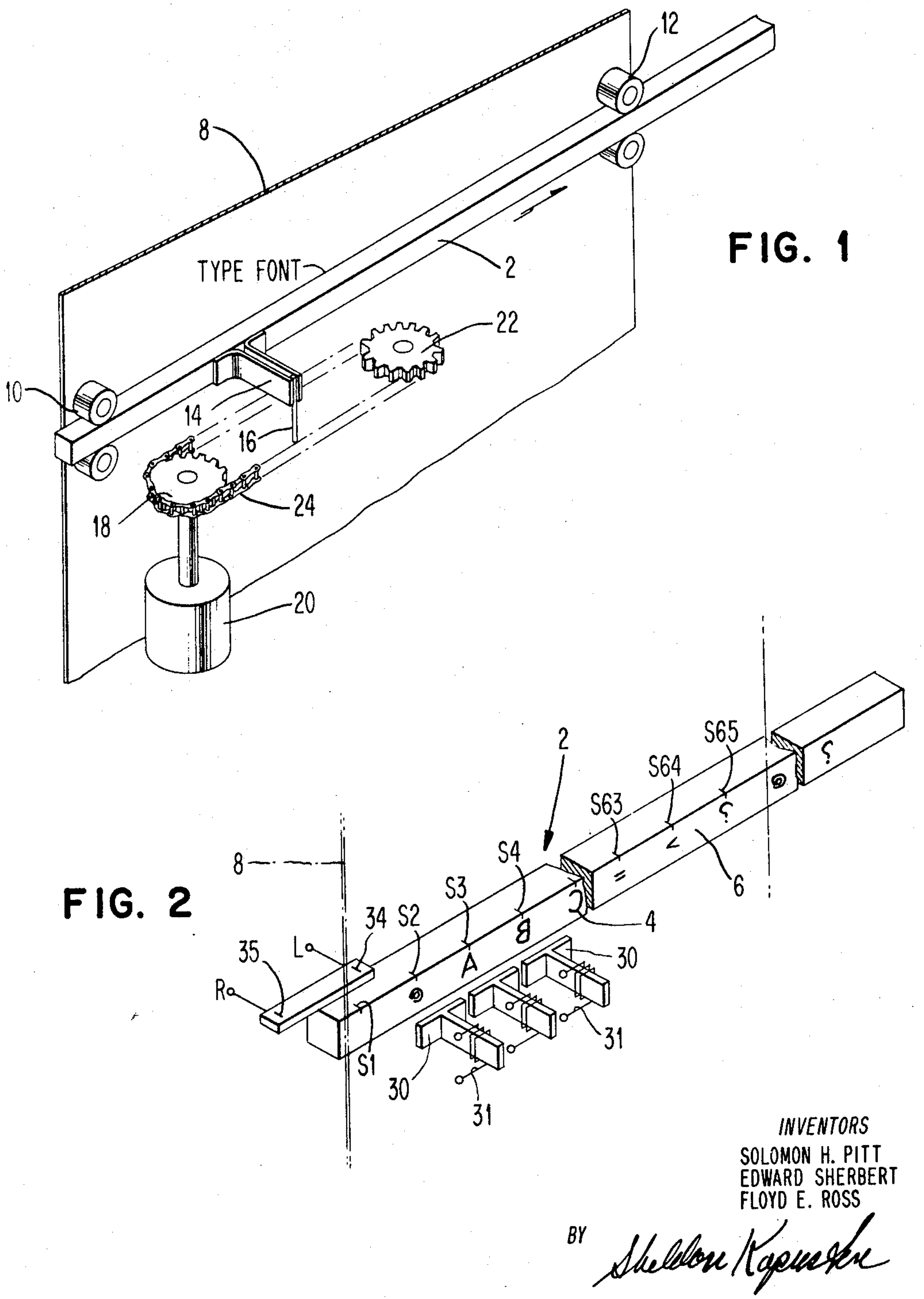

Refer now to FIGURES 1 and 2 which illustrate a print bar and its associated drive assembly. The print bar 2 of FIGURE 1 is moved between two pairs of guide rollers 10 and 12 to insure its horizontal alignment with respect to the record 8. Bar 2 has affixed to its rear surface a yoke 14 mounted perpendicular to the rear surface of the bar. The yoke 14 contains a pin 16 which is mounted perpendicular to the surface of the yoke 14.

The drive assembly for the print bar 2 consists of a first sprocket 18 driven by a constant speed motor 20. A second sprocket 22 is provided and a roller chain 24 is placed around the periphery of the sprockets 18 and 22 and driven thereby. The yoke 14 is connected to the roller chain 24 by means of the pin 16, which may be affixed to the upper surface or to the outside surface of the roller chain 24. As a result of the constant speed of which motor 20 rotates and the positive connection between the sprockets 18 and 22 and the roller chain 24, the pin 16 is driven at a constant linear speed as it moves from sprocket 18 to sprocket 22 and back. As the pin 16, connected to the roller chain 24, moves from sprocket 18 to sprocket 22, the print bar 2 will be moved from left to right as shown in FIGURE 1 by the arrow. As the pin 16 moves with the roller chain 24 from sprocket 22 to sprocket 18 the print bar 2 will move from right to left.

During the period when the connection between the roller chain 24 and the print bar 2 at pin 16 moves about the end portions of the sprocket circumferences, the bar 2 will decelerate to zero velocity and begin acceleration to the maximum linear velocity in an opposite direction. This period may be employed for movement of the record and also to provide an indication that the direction of the bar movement is about to change.

FIGURE 2 illustrates a standard print bar and shows a plurality of character type mounted upon a surface 6 of the bar 2. The character type 4 is arranged in a plurality of discrete fonts, that is complete repertoires of character type which may include the full alphabet, the numerals from 0 to 9, and any of the punctuation and special symbols which may be required. There may be as many repetitions of the complete font and font portions along the surface 6 of the bar 2 as is desired. The number of fonts or font portions on the print bar 2 should be such that each record character space is exposed to all the characters in a font. Thus, should a single font appear on the surface of the bar 2, each character on the bar 2 would have to travel the entire distance across the width of the record 8 presented before the bar 2. By using a number of complete fonts on the surface 6 on bar 2, the movement of the bar is decreased and is equal to the length of one complete font.

Mounted in line with the character type 4 and behind the record 8 are a series of print hammers 30. Each of the print hammers 30 has face portions **30*a* and 30*b* wide enough to span two record character spaces. The centers of the print hammers 30 are aligned with the interspace between adjacent character spaces such that the print hammers 30 can strike character type 4 aligned with either of the character spaces. Due to the spacing of the character type 4 along the print bar 2, it is not possible for the print hammers 30 to strike character type in both character spaces simultaneously. Instead, one face 30*a* of the print hammers 30 is used to print in odd character spaces on the record 8 when the character type 4 is aligned therewith and the bar 2 is moving in a first direction. The second face 30*b* of the print hammers 30 is employed to print in even character spaces of the record 8 when the character type 4 is aligned therewith and the bar 2 is moving in a second opposite direction. Each of the print hammers 30 has an actuator coil 31** associated therewith, and operated by the circuit to be described with reference to FIGURE 6.

The character type 4 is placed along the print bar 2 at positions corresponding to every other one of the record character spaces. The spacing of the individual character type 4 along the print bar 2 is uniform and corresponds to alternate character spacing on the record.

In this embodiment it will be assumed that the font comprises sixty-four characters and that there are two complete fonts on the bars 2. Further, it will be assumed that the record 8 may comprise 128 printable columns or record spaces.

The timing signals which control the operation of the printer are produced by the sprockets S1 to S65 on the surface 6 (see FIGURES 2 and 3) of the bar 2. The sprockets in the preferred embodiment are magnetized spots. Each character type in the first font on the bar 2 has one such sprocket associated therewith. In addition, the first sprocket S1 leads the first character type on the bar 2 by two character spaces. The rest of the sprockets S2 to S65 are shown in line with their respective character types in the first font. Sprockets are not associated with the character types in the second font.

The sprockets S1 etc. are detected by a pair of in line magnetic read heads 34 and 35, which produce respectively the L or left sprocket pulse and the R or right sprocket pulse in response to the sprockets S1 to S65. These L and R sprocket pulses are produced when the sprockets pass under the heads 34 and 35. While the sprockets are shown adjacent and in line with the corresponding character type 4 on the bar 2, the sprockets and the magnetic read heads 34 and 35 may be laterally translated on the bar 2 as desired.

While magnetic spots are shown for the sprockets, it will be readily appreciated by those skilled in the art that other sprocket markers, such as light reflecting surfaces etc. could be used with appropriate transducers.

Refer now to FIGURES 3*a* to 3*d* which illustrate in more detail the first bar 2 as well as the read heads 34 and 35 and their relationship to the columnar positions of the record 8. The read head 34 which produces the L sprocket pulse is in line with column 2 of the record 8 and the read head 35 which produces the R sprocket pulse is three column positions to the left of read head 34. Head 35 is not adjacent to any part of the record 8. The bar 2 is shown as comprising two sets of fonts, wherein each font has sixty-four characters from "@ to ?". Also shown are sixty-five sprockets S1 to S65. The 64 characters in each of the fonts comprises symbol @, letters A through Z, and numeric symbols [ \ ] Δ □ space ! ≠ # $ % & ' ( ) * + , - . / ϕ 1 2 3 4 5 6 7 8 9 : ; < => ?. Each of these character types is represented by a binary value. The first character in the font (@) is represented by the binary value 000000 (or zero) and the last character in the font (?) is represented by the binary value 111111 (or 63). The intermediate characters of the fonts are likewise represented by intermediate binary values according to their relative order in the fonts; i.e., according to their position on the print bar 2.

Figures 3A, 3B, 3C, 3D:
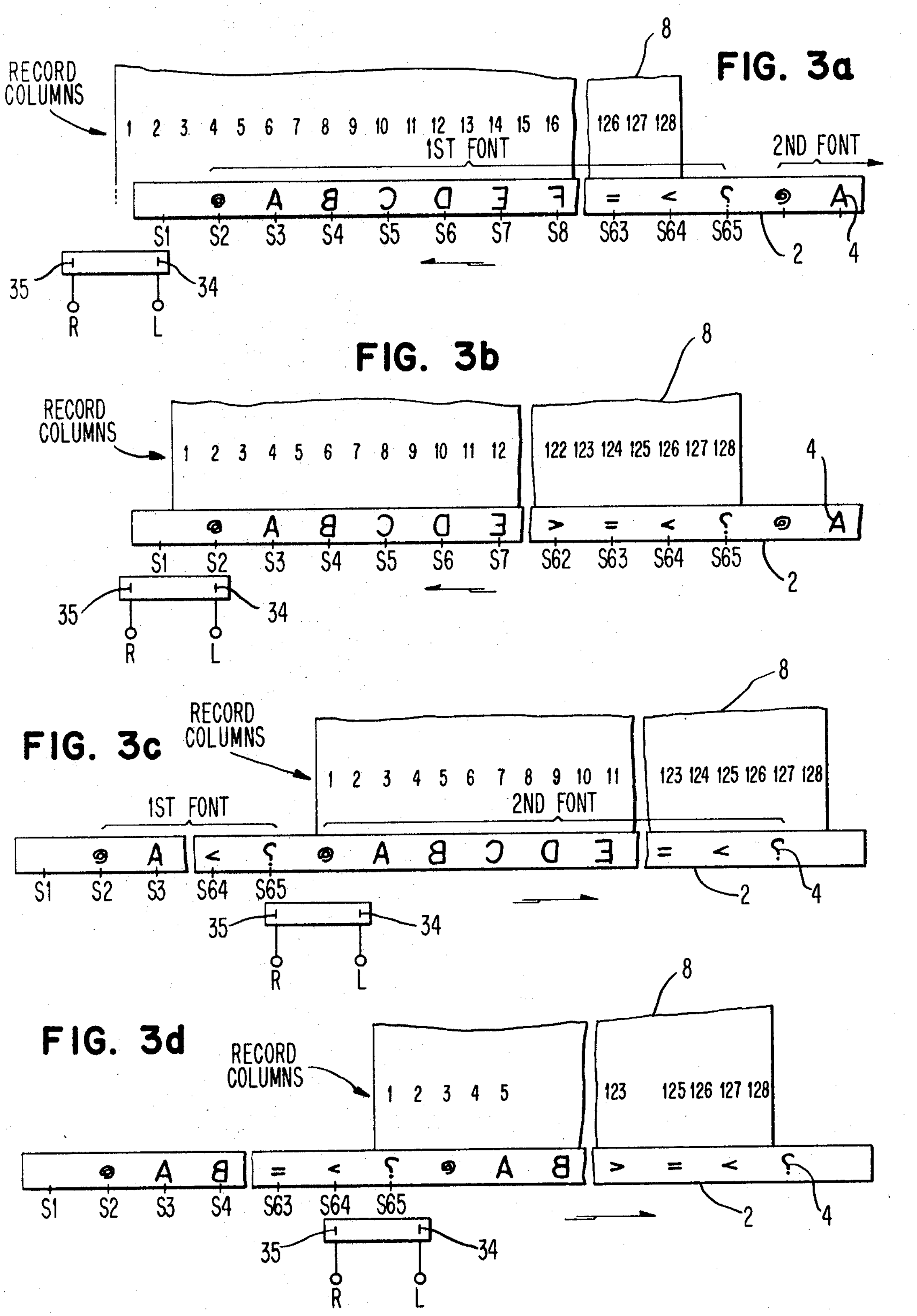

FIGURE 3*a* shows the bar 2 after it has moved to its right most position and has started to move left across the record 8. When the bar 2 changes direction, a period of time exists when it is not being translated across the record 8 and heads 34 and 35 do not produce either the L or R sprocket pulse. Control apparatus is provided which responds to this condition and produces a turnaround signal (TA) indicative thereof. It can be seen from FIGURE 3*a* that as the bar 2 continues to move left the first sprocket S1 will be detected by head 34 which will produce, in response thereto, an L sprocket pulse. Additional control apparatus is provided on FIGURE 4 which is responsive to the first sprocket pulse (L or R) produced after the bar turnaround period to indicate the direction of the print bar movement. Accordingly, when the bar is moving left, read head 34 products an L sprocket pulse in response to sprocket S1 and sets control apparatus (see particularly flip-flop 92 on FIGURE 4) to indicate that the bar 2 is moving left.

FIGURE 3*b* illustrates the bar 2 after it has continued its leftward travel to a point where the second sprocket S2 is detected by head 34. At this time it can be seen that all the characters 4 on the bar 2 are in line with even column positions of the record 8. Thus, as each sprocket S2 etc. is detected by head 34, when the bar 2 is moving left, character types 4 on the bar 2 may be imprinted in even columns of the record 8 by the double width hammers shown in FIGURE 2. That is, when sprocket S2 is detected the character types @, A, B . . . > and ? may be printed in columns 2, 4, 6 . . . 126, and128 and when sprocket S3 is detected —the characters A, B, C . . . ? and @ may be printed in columns 2, 4, 6 . . . 126 and 128. As the bar 2 continues to move left, the head 35 senses the sprockets S1, S2 etc. However, as shall be seen, sprockets detected by the head 35 produce R signals which are not used when the print bar 2 is moving left. After sprocket S65 is detected the printing operation for characters in even columns on the record 8 is ended.

FIGURE 3*c* shows the bar 2 after it has moved to its left most position and has started to move right across the record 8. Again during the dwell time when the bar 2 changes direction the turnaround signal (TA) will be produced. It can be seen from FIGURE 3*c* as the bar continues to move right that sprocket S65 is the first one to be detected and it is detected by read head 35 which produces the R signal. The control apparatus on FIGURE 4 which shall later be described in detail responds to the first sprocket pulse (the R signal) produced after the bar turnaround period to indicate the direction of the bar movement. Accordingly, when the bar 2 is moving right read head 35 produces a signal pulse in response to sprocket S65 to set the control apparatus on FIGURE 4 which in turn indicates that the bar is moving right.

FIGURE 3*d* illustrates the print bar after it has continued its rightward travel to a point where the second sprocket S64 is detected by read head 35. At this time it can be seen that all the character types (in the second font) on the bar 2 are in line with odd columns of the record 8. Thus, as each sprocket S64, S63, etc. is detected by read head 35, when the bar 2 is moving right those character types on the bar 2 may be imprinted in odd columns of the record 2. That is, when sprocket S64 is detected the characters ?, @, A . . . = and > may be printed in columns 1, 3, 5 . . . 125 and 127. Further, when sprocket S63 is detected the characters > ? @ . . . < and = may be printed in columns 1, 3, 5 . . . 125 and 127. As the bar 2 continues to move right, the head 34 senses the markers S65, S64 etc. However, as shall be seen sprockets detected by head 34 are not used when the bar 2 is moving right. After sprocket S1 is detected the printing operation for characters in odd columns on the record is ended.

Figures 6, 6A:
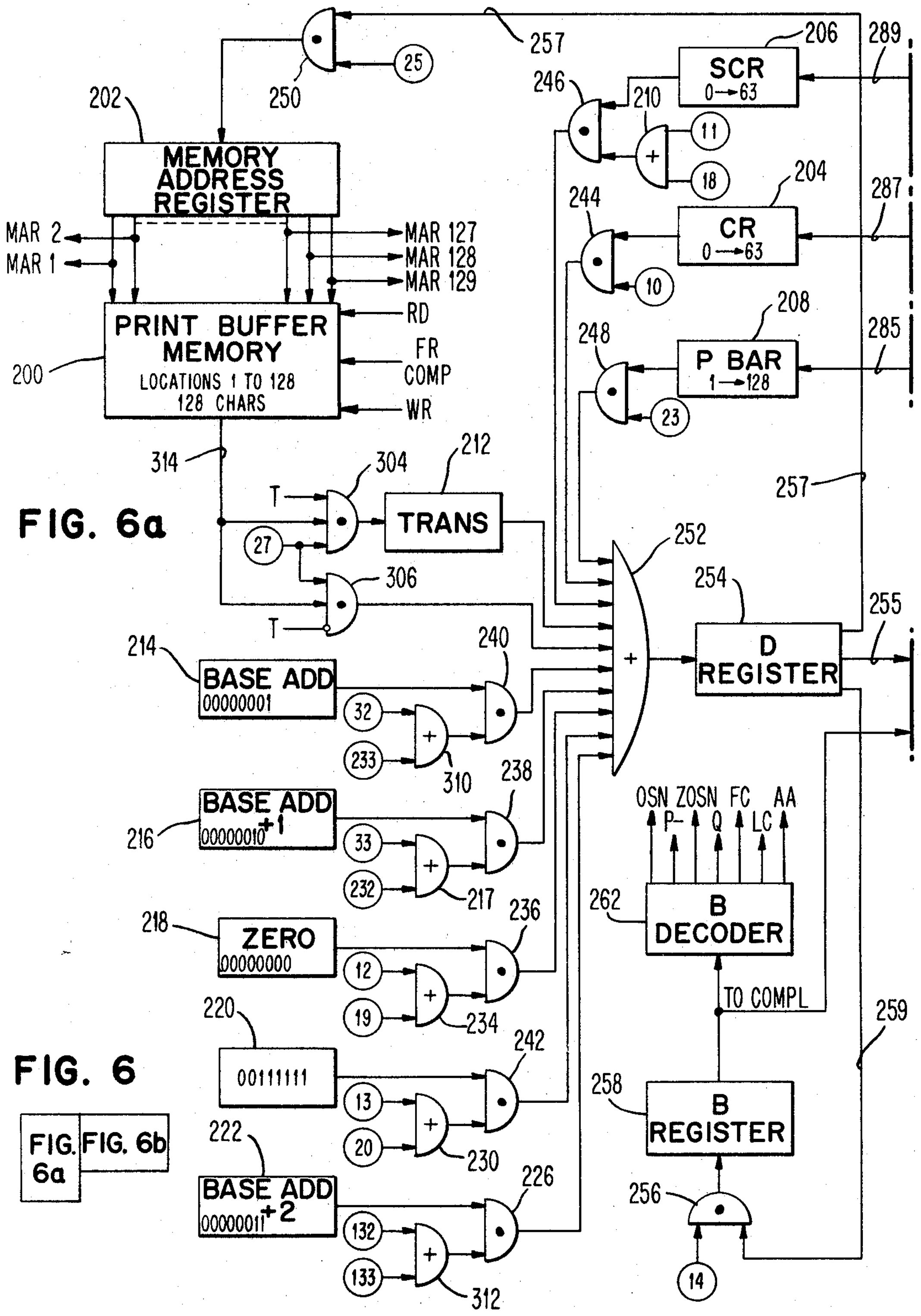

The sprockets S1 etc. and the signals they produce serve a number of functions. First it will be appreciated that neither the L or R signals will be produced when the bar 2 is changing direction. The absence of the L and R sprocket pulses is detected by the apparatus shown in FIGURE 4 and this apparatus indicates when the print bar 2 is changing direction. Further, as shall be seen, each sprocket except the last one to be detected when the bar 2 is moving right or left respectively causes the contents of the even or odd locations of the buffer memory 200 (see FIGURE 6) storing the line of the message to be scanned and sequentially compared with the representations of character types on the bar 2. That is, each sprocket except as noted causes a scan of the buffer memory 200 (FIG. 6). In general the odd locations of the memory are scanned for each sprocket when the bar 2 moves right and the even locations of the memory are scanned for each sprocket when the bar 2 moves right and the even locations of the memory are scanned for each sprocket when the bar 2 is moving left.

In addition all the sprockets except the first one to be detected (i.e., either S1 or S65) cause the print hammers 30 (FIG. 2) to be selectively fired.

Figure 4:
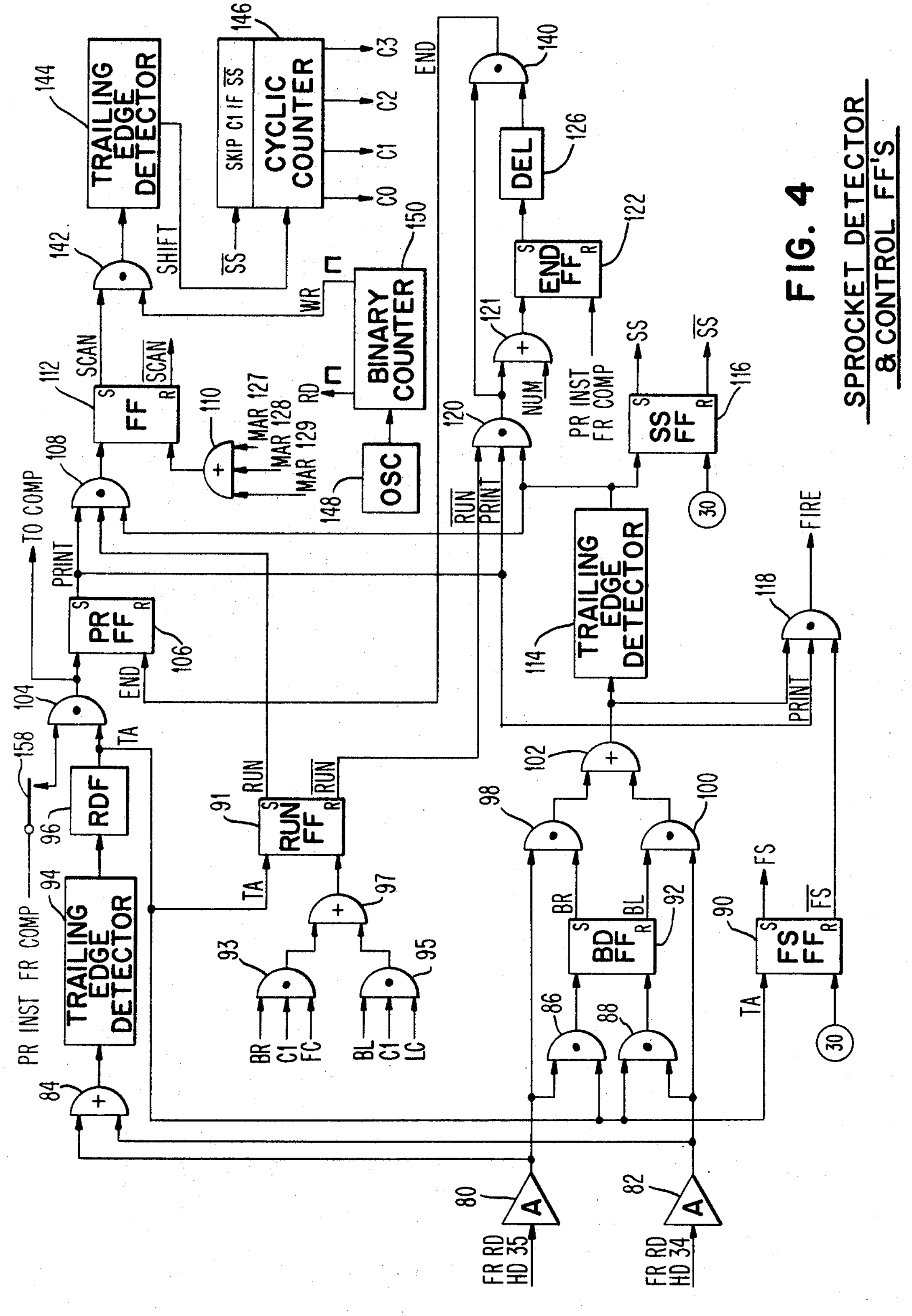

Refer now to FIGURE 4 which shows the control apparatus responsive to the sprocket pulses from heads 34 and 35 (FIGS. 2 and 3). In this drawing as well as the others to follow AND gates are shown as a half moon with a dot in the center and OR gates are shown as a half moon with a plus (+) in the center.

Figure 4A:
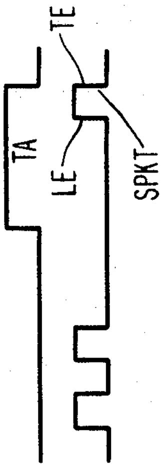

The L and R sprocket pulses from read heads 34 and 35 are applied respectively to the inputs of sprocket amplifiers 82 and 80. Each R signal is transmitted through amplifier 80 to one input of an OR gate 84 and to one input of AND gates 86 and 98. Likewise each L signal from read head 34 is transmitted through amplifier 82 to the other input of OR gate 84 and to one input of AND gates 88 and 100. The waveform of the output for sprocket amplifiers 80 or 82 is shown in line 1 of FIGURE 4*a* and it can be seen from this figure that the sprocket pulse is of definite width and has a leading and trailing edge marked respectively LE and TE.

The output from either sprocket amplifier 80 or 82 is transmitted through OR gate 84 to the input of trailing edge detector 94. Trailing edge detector 94 produces an output in response to every sprocket detected. This output is synchronous with the trailing edge of each sprocket pulse. Trailing edge detector 94 is connected to the input of resettable delay flop 96. As long as resettable delay flop 96 continually receives the L and R sprocket pulses from heads 34 and 35 it will not produce an output signal. However, when the bar 2 is changing direction, L and R pulses will not be produced and the resettable delay flop 96 recovers and produces the output signal referred to above as the turnaround signal (TA). The waveform for the turnaround signal is shown in line 2 of FIGURE 4*a* and it can be seen from this figure that the turnaround signal (TA) ceases concurrently with the trailing edge of the first sprocket detected after the print bar 2 has changed direction.

The TA signal is available during the bar turnaround period and is applied to one input of AND gates 104, 86 and 88 as well as the set input of FS flip-flop 90 and the run flip-flop 91.

The outputs of gates 86 and 88 are connected to the set and reset inputs respectively of the bar direction flip-flop 92. When bar direction flip-flop 92 has received a set input, it produces the BR signal and when it receives a reset input it produces the BL signal. The BR and BL signals are indicative that the print bar is moving right or left, respectively. The BR and BL signals are applied, respectively, to the second inputs of AND gates 98 and 100 and the output of these two gates are in turn applied to the two inputs of OR gate 102. The output of OR gate 102 is applied to one input of print fire AND gate 118 and via trailing edge detector 114 to one input of AND gates 108 and 120 as well as to the set input of SS flip-flop 116. When set, the flip-flop 116 produces the SS signal. Print fire AND gate 118 also receives at its inputs the FS output of flip-flop 90 and the print signal from flip-flop 106. Flip-flops 90 and 116 are reset by the FS30 function signal (see FIG. 7) and produce when reset the $\overline{FS}$ and $\overline{SS}$ signals respectively.

The turnaround signal (TA) from resettable delay flop 96 controls AND gate 104 which receives the print instruction signal from a computer (not shown). For illustrative purposes the print instruction may be considered to be generated in response to the closure of an electronic switch 158. The output of gate 104 is applied to the set input of the print flip-flop 106 which produces the print signal. Additionally, the output of gate 104 may be returned to the computing unit to signal that unit that the print operation has commenced and to remove the print order signal from the input of gate 104.

Print flip-flop 106 in response to a set input from gate 104 produces the print signal which is applied to AND gates 108, 118 and 120. The output of AND gate 108 is applied to the set input of scan flip-flop 112 which produces in response thereto the scan signal. The reset input of flip-flop 112 is connected to the output of OR gate 110 which in turn receives at its input the MAR127, MAR128 and MAR129 signals. The MAR127 and 128 signals are generated when the last odd or last even locations in the buffer memory 200 (FIG. 6) is being addressed. The MAR 129 signal may be generated when the offset print bar is used after the last location in the buffer memory 200 is addressed. The MAR signals are produced by the memory address register 202 shown on FIGURE 6.

The basic cycle of operation of this printer is controlled by free-running oscillator 148. This oscillator is connected to the input of binary counter 150 which toggles and alternately produces the read pulse RD and write pulse WR, 180° displaced from each other. The write pulse (WR) from binary counter 150 and the scan signal from the set output of flip-flop 112 are applied to AND gate 142 which in turn is connected at its output through trailing edge detector 144 to the input of a four stage cyclic counter 146. The four counts produced by counter 146 are designated C0, C1, C2 and C3. Each output from trailing edge detector 144 causes the counter 146 to shift its output to the next higher stage, so that the counter 146 cycles and produces outputs C0, C1, C2 and C3 in order in response to the shift pulses produced by trailing edge detector 144. These shift pulses are synchronous with the trailing edge of the write pulse transmitted through AND gate 142 and detected by element 144. Cyclic counter 146 is controlled by the $\overline{SS}$ signal from SS flip-flop 116. When the $\overline{SS}$ signal is present C1 outputs are not produced and the counter 146 cycles through outputs C0, C2 and C3. Counter 146 is shown in more detail in FIGURE 5. The operation of the counter 146 and the control exercised by the $\overline{SS}$ signal will be explained in connection with that figure. Suffice it to say, that when the $\overline{SS}$ signal is present, the counter 146 operates as a three stage counter and produces signals in the order mentioned above.

It should be noted that the counter 146 is cyclic and that a shift pulse received when the counter is producing a C3 output will step the counter back to an output of C0.

Counter 146 is cycled a number of times for each sprocket pulse transmitted via buffer 102. In particular counter 146 goes through a cycle of operation once for each memory location addressed in the buffer memory (FIG. 6). Only on the first such cycle after the receipt of a sprocket pulse is the C1 count produced by counter 146. The rate at which counter 146 cycles is a function of the frequency of oscillator 148 which is adjusted so that counter 146 may cycle at least sixty-four times for each sprocket pulse received. The number of cycles of operation for counter 146, per sprocket pulse, is a function of the size of the buffer memory 200 (FIG. 6) storing a line of material to be printed.

The print operation is terminated by the run flip-flop 91 operating in conjunction with the end flip-flop 122. The set input of flip-flop 91 is connected to receive the TA signal so that at the beginning of the print operation this flip-flop produces the run signal. The run signal is applied as an input to AND gate 108. The reset input of the run flip-flop 91 is connected via OR gate 97 to the outputs of AND gates 93 and 95. When either AND gate 93 or 95. When either AND gate 93 or 95 produces an output OR gate 97 transmits a signal resetting run flip-flop 91 which in turn produces the $\overline{\text{run}}$ signal. AND gate 93 receives at its inputs, the BR signal from flip-flop 92, the C1 count signal from counter 146 and the FC output of B decoder 262 on FIGURE 6. Gate 93 resets flip-flop 91 when the print bar is moving right and the first character in the font is to be printed in the first column of the record, i.e., the printing of characters in the even columns of the record 8 is about to terminate.

AND gate 95 receives the BL signal from bar direction flip-flop 92, the C1 count signal from counter 146 and the LC output of the B decoder 262. Gate 95 resets flip-flop 91 when the print bar is moving left and the last character in the font is to be printed in the second column of the record, i.e., the printing of characters in the even columns of the record 8 is about to terminate.

The $\overline{\text{run}}$ signal is applied to AND gate 120, which also receives the print signal from flip-flop 106 and the output from trailing edge detector 114. The output of AND gate 120 is applied to AND gate 140 and via OR gate 121 to the set input of end flip-flop 122. OR gate 121 also receives the NUM signal which is produced whenever the offset bar (FIG. 9) is used to print a complete line of essentially numeric characters in one sweep across the record 8. The end flip-flop 122 is reset each time a print instruction is received from the computer. The set output of flip-flop 122 is applied to AND gate 140 via delay element 126. AND gate 140 produces the end signal which resets flip-flop 106 and terminates the print operation.

Before proceeding with the description of the remaining figures, the functions of the control apparatus on FIGURE 4 will be briefly explained. In the discussion that follows it will be assumed that a print instruction is available from the computer. In general the apparatus of FIGURE 4 operates in response to the sprockets S1 through S65 from print bar 2 to control the firing of the print hammers (FIG. 2); to indicate the direction of bar movement; and to control the scanning of the buffer memory 200 (FIG. 6) and the sequential operations of the printing device.

As the bar 2 moves, read heads 34 and 35 produce pulses which are amplified by elements 80 and 82 and applied thereby through OR gate 84 and trailing edge detector 94 to resettable delay flop 96. The sprocket pulses applied to resettable delay flop 96 keep this element reset and prevent the generation of the TA signal. The TA signal controls AND gates 86, 88 and 104 and flip-flops 91 and 106. In the absence of the TA signal the print order cannot be transmitted through AND gate 104 nor can the bar direction flip-flop 92 receive an input. However, when the bar 2 turns around, sprockets will not be detected by heads 34 and 35 and accordingly amplifiers 80 and 82 will not supply energizing signals to resettable delay flop 96. Thus, when the bar 2 changes direction the TA signal is produced and alerts the aforementioned AND gates.

Assuming that the bar is starting its leftward motion the first sprocket (i.e., S1) is detected by head 34 (FIG.

2) and causes amplifier 82 to apply a pulse to now alerted AND gate 88 which in turn applies a signal to reset the bar direction flip-flop 92. When reset, flip-flop 92 produces a steady state bar left (BL) signal which is applied to AND gate 100. AND gate 100 also recieves this same sprocket pulse (S1) and accordingly transmits substantially the entire sprocket pulse via OR gate 102 to the input of AND gate 118 and via trailing edge detector 114 to the set input of SS flip-flop 116 and to one input of AND gate 108.

The trailing edge of the same sprocket signal (S1) which resets the bar direction flip-flop 92 is also applied via OR gate 84 to trailing edge detector 94. The output of detector 94 resets resettable delay flop 96 thereby removing the TA signal. Thus, this first output fo amplifier 82 is transmitted via AND gate 88 to flip-flop 92 but additional sprocket signals, either L or R, will not be transmitted via AND gates 86 or 88 to effect the bar direction flip-flop 92. Further only additional L pulses produced by head 34 in response to sprockets S2 etc. will be transmitted through AND gate 100 and OR gate 102 because of the reset state of bar direction flip-flop 92. The R signals produced by read head 35 and amplified by element 80 cannot pass gate 98 to buffer 102 because flip-flop 92 is reset (i.e., the BR signal is not present).

Every sprocket pulse transmitted via OR gate 102 provides an alerting signal to the print fire AND gate 118. AND gate 118 produces the print fire pulses which actuates the apparatus (FIG. 6) controlling the print hammers. As shall be shown the remaining two inputs (print and $\overline{FS}$) to gate 118 are available during the print operation. Accordingly, when the bar 2 is moving left, the fire pulse from gate 118 is produced in response to every sprocket detected by read head 34. In a similar way when the bar is moving right every sprocket detected by read head 35 produces a fire pulse.

Further every sprocket pulse transmitted via OR gate 102 and trailing edge detector 114 sets flip-flop 116 which produces the SS signal. Flip-flop 116 is reset by the 30 functional signal to produce the $\overline{SS}$ signal which controls counter 146. The 30 functiona signal is produced, as shall be explained, as counter 146 cycles through its first set of outputs. Thus, it should be recognized that while the counter 146 cycles many times between each sprocket pulse only the first cycle after a sprocket pulse does it produce a count of C1.

As indicated above, the turnaround signal (TA) from resettable delay flop 96 is applied to set FS flip-flop 90 which produces the FS signal in response thereto. The flip-flop is reset by the 30 function signal which is produced during the first cycle of operation of counter 146. Thus, the FS signal indicates that the bar has just turnaround and is only available after the first detected sprocket, i.e., either sprocket S1 or S65 depending on the direction of the bar 2.

In addition the TA signal is applied to gate 104 which transmits the print order from the computer to the apparatus controlling the print operation. The output of gate 104 is used to set the print flip-flop 106 which in turn alerts gates 108, 118 and 120. The output of gate 104 is also used to signal the computer so that it may go on with other operations, as well as to remove the print instruction signal from gate 104. It will be appreciated when the print order signal is present that gate 104 will transmit a signal which sets the print flip-flop 108 as soon as the first sprocket is detected after the TA signal is produced. The first sprocket to be detected (as well as others which follow) and transmitted either via amplifier 80 or 82 and through AND gates 98 or 100 via OR gate 102 and trailing edge detector 114 is applied to AND gate 108. AND gate 108 produces an output because the run and print signals from flip-flops 91 and 106 are also present. The output of AND gate 108 sets the scan flip-flop 112. All but the last sprocket detected after the TA signal is available causes AND gate 108 to produce a signal which sets the scan flip-flop 112.

The scan signal from flip-flop 112 is applied to one input of AND gate 142. This gate also receives the periodic write pulses from binary counter 150. The output of gate 150 is applied via trailing edge detector 144 to shift the counter 146 at the end of a write pulse.

One function of counter 146 is to cause the locations in memory 200 to be read out each time all, but the last sprocket, from the print bar is detected. The last sprocket to be detected will either be the sprocket associated with the first or last character in the font depending on the direction of the print bar. This function can only be carried out when the scan flip-flop 112 is set and produces the scan signal. When the last location in the memory 200 is being addressed the memory address register will be indicating an address of 127, 128 or 129 and will thus be producing either the MAR127, MAR128 or MAR129 signal. Any one of these signals will reset the scan flip-flop 112. Normally all the other sprockets (and any one except the last) detected on the print bar 2 will set the scan flip-flop 112 via OR gate 102, element 114 and 108. However, the last sprocket is not permitted to pass through gate 108. As shall later be explained the run flip-flop 91 is reset when the next to the last sprocket is detected and the run signal is at that time removed from gate 108. The next to the last sprocket detected cannot pass through gate 108 and set the scan flip-flop 112. After the last sprocket is detected the run flip-flop 91 is reset by the TA signal.

The end flip-flop 122 is used to indicate that the bar has completed a full cycle of operation; that is, the bar has moved to and fro across the record 8 and that the print operation is complete. Flip-flop 122 produces the end signal via AND gate 140 which resets the print flip-flop 106. The end flip-flop also produces the end signal via gate 140 when the bar has gone through a half cycle, i.e., has moved completely in either direction across the record 8. This occurs when the offset bar (FIGURE 9) is used to print essential numerical characters.

The operation of the end flip-flop and run flip-flop 122 will be explained later in detail.

Figure 5:
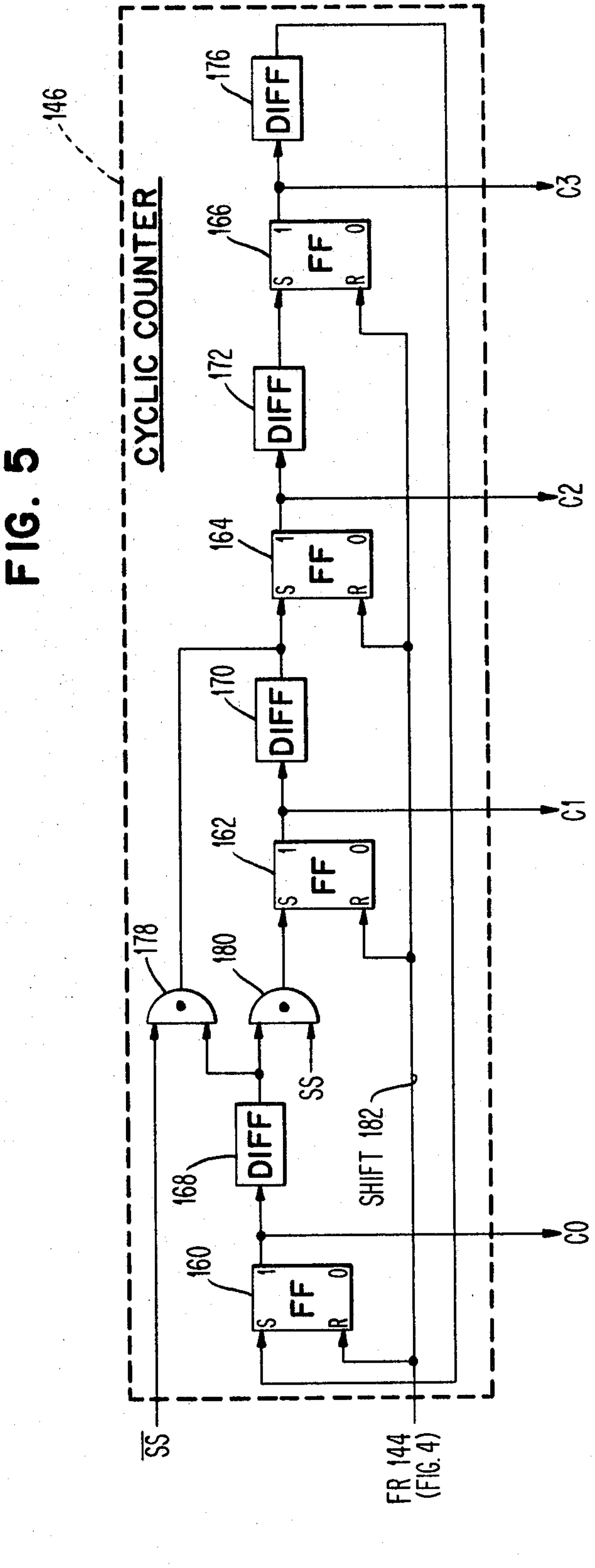

Refer now to FIGURE 5 which shows a more detailed block diagram of the cyclic counter 146.

The counter 146 comprises four flip-flops 160, 162, 164 and 166 series connected in a ring. Each of the flip-flops 160 etc. has a "1" and a "0" output state and associated output terminals as well as a set and reset input. When any of the flip-flops 160 receives a signal at its reset input, the flip-flop is forced to its "0" state and when a flip-flop 160 etc. receives a signal at its set input, it is forced into the "1" state and will produce an output at the terminal marked "1." The "1" output terminals of flip-flop 162, 164 and 166 are connected through differentiators 170, 172 and 176 to the set inputs of flip-flops 164, 166 and 160 respectively. The "1" outputs of flip-flop 160 is connected via differentiator 168 to one input of gates 178 and 180. Gates 178 and 180 also receive the $\overline{SS}$ and SS outputs respectively from flip-flop 116 (FIGURE 4). The output of gates 178 and 170 are connected, respectively, to the set inputs of flip-flops 162 and 164.

All the reset inputs of flip-flops 160 etc. are connected to the shift line 182 which receives the output pulses from the trailing edge detector 144 of FIGURE 4.

In operation only one of the flip-flops 160 etc. it in the "1" output state at any time. The flip-flop in the "1" output state determines the count; i.e., flip-flops 160, 162, 164 and 166 produce respectively the counts of C0, C1, C2 and C3 respectively at their "1" output terminals. When a flip-flop which is set in the "1" state receives a shift pulse at its reset input, the output from that flip-flop will change from a "1" to a "0." The differentiator connected to that flip-flop in turn produces an output that is transmitted to the set input of the flip-flop next in the chain. In this manner the state of any one flip-flop is shifted to the next flip-flop in the chain and the count of the cyclic counter 146 is increased.

It will be noted that the output of flip-flop 160 is either transmitted through gate 180 to flip-flop 162 producing count C1 or is transmitted through gate 178 to flip-flop 164 which produces the count of C2. When flip-flop 116 is set (FIGURE 4) and produces the SS signal the count in flip-flop 160 will be shifted through gate 180 to flip-flop 162 and when flip-flop 116 is reset and produces the $\overline{SS}$ signal the count in flip-flop 160 will be shifted to flip-flop 164.

When a count of C3 is produced by flip-flop 166 the next shift pulse causes this flip-flop to change its output state whereby differentiator 176 produces a pulse that is applied to the set input of flip-flop 160. In this manner the counter 146 is cycled.

Figure 6B:
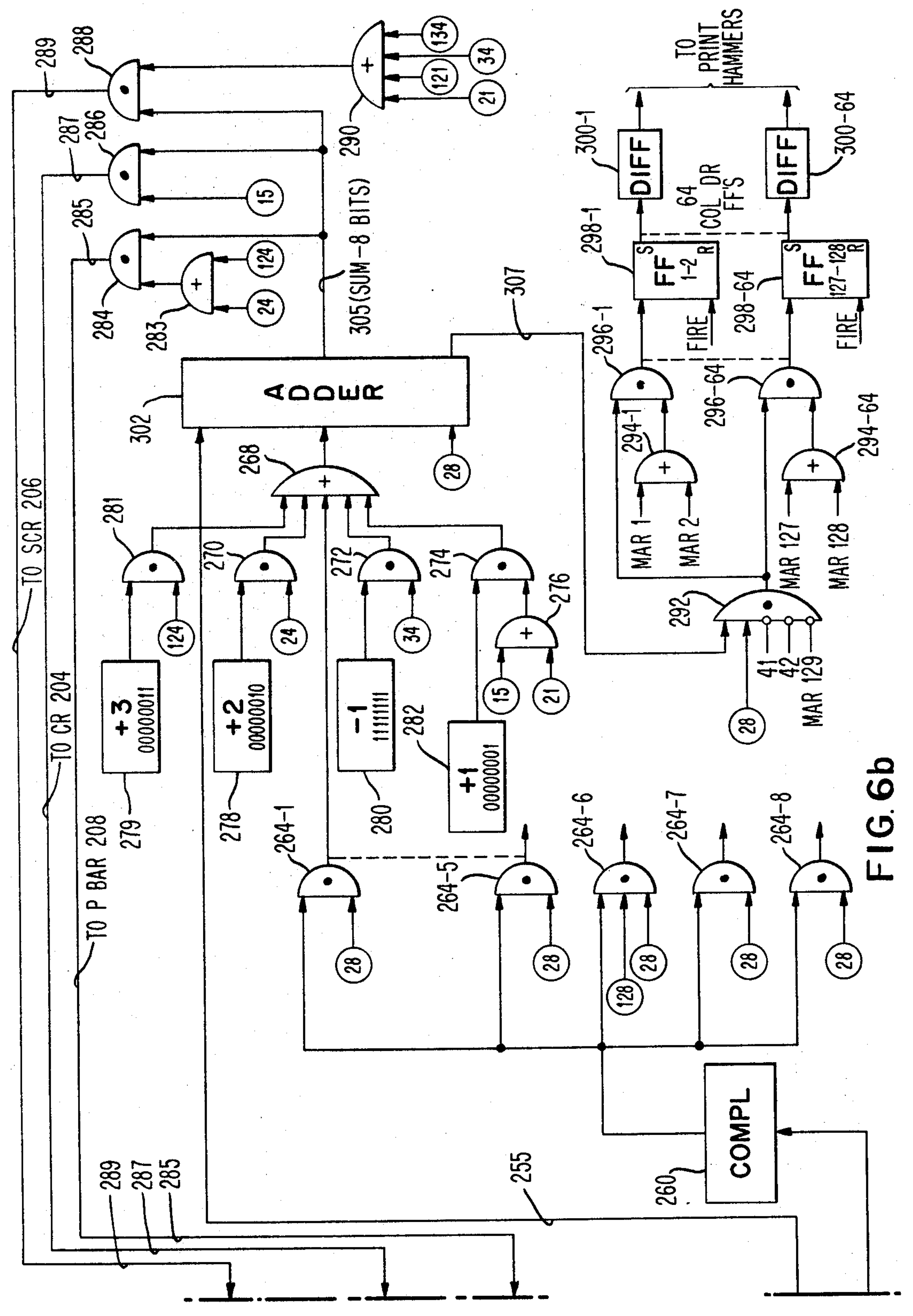

Refer now to FIGURES 6*a* and 6*b* which are a block diagram illustrating the interconnection of those elements that ultimately cause the firing of the print hammers of FIGURE 2. The print buffer memory 200 (FIG. 6*a*) has 128 addressable storage locations. Each location stores a character of the message to be printed in a column of the record 8 (FIGURE 2). In particular each location may store eight bits defining a character to be printed. The messages are arranged in the print buffer memory 200 so that the character of the message in memory location 1 is printed in the first column position of the record and the character in location 128 is printed in the 128th column position of the record. Intermediate locations in the memory store characters for corresponding intermediate columns on the record 8.

The contents of the print buffer memory 200 may be changed by reading in new information from a main memory of a computer (not shown). The print buffer memory 200 may also comprise a portion of a large memory used in such computers.

In the specific embodiment of this invention it is contemplated that the buffer memory 200 comprises magnetic cores arranged in eight planes. Such memories are generally cyclic in operation and have one specific time for reading information from the memory and another for writing information into the memory. The periodic signals read (RD) and write (WR) generated from binary counter 150 (FIGURE 4) are applied to the memory for this purpose. Obviously, however, other types of memories may be employed.

As has already been indicated there are sixty-four characters in the font. Accordingly, any character in the message can be represented by the combination of six binary "1" or "0" bits which are represented by a pulse and the absence of a pulse respectively. While a specific memory location can store eight bits only the first six bits are needed to define a character. The two most significant bits in each memory location may be used for other purposes, as parity bits etc. Therefore, each location in the memory 200 stores six bits defining a character and two bits which as for this invention is concerned are of no significance. These two bits are assumed to represent "0" binary values. When a location in the memory 200 is read out all the eight bits defining a character are avalaible simultaneously on cable 314. In this regard it should be noted that the cable 314 is shown on the drawings as a single line. However, cable 314 comprises a plurality of single lines. That is, there is one line for each bit of a character or one line for each of the planes of cores in memory 200. The lines of cable 314 are connected to AND gates 306. While AND gates 306 are as one gate it will be understood that each line of cable 314 is connected to a separate gate. For simplicity the cables in FIGURES 6*a* and 6*b* are shown as a single line and the plurality of gates receiving the bits comprising a character are shown as one gate. This convention is applied to the description of FIGURE 6. In general each of the lines on FIGURE 6 represents a cable with eight conductors and an OR gate or AND gate receiving such a cable represents eight gates and will be referred to in the singular.

The contents of a selected location from the buffer memory 200 are transmitted over cable 314 to the inputs of AND gates 304 and 306. AND gates 304 and 306 are alerted by the 27 function signal produced by the control matrix of FIGURE 7. Further AND gate 304 is alerted by the presence of the T signal produced by the control matrix of FIGURE 8 and AND gate 306 is inhibited when the T signal is produced. The 27 function table signal is generated when it is desired to transmit a character in the buffer memory 200 to the D register 254 for comparison with a representation of the character type on print bar 2. The T signal controlling gates 304 and 306 is present only when the offset bar (shown in FIGURE 9) is used. When the standard bar (FIG. 3) is used AND gate 306 is operative and transmits the character read from memory 200 directly into the D register 254 via buffer 252. When the T signal is present AND gate 306 is inhibited and AND gate 304 transmits the information from the memory via translator 212 and buffer 253 to the D register 254. The function of the translator 212 will be described in connection with the operation of the printer when the offset bar (FIG. 9) is employed.

The D register 254 also receives the contents of the print buffer address register 208 (PBAR), the start character register 206 (SCR) and the code register 206 (CR). Although these registers are shown as separate entities they may be in fact a part of the main memory of the computer. The D register 254 and registers 204, 206 and 208 each may also store up to eight bits although the information they receive or transmit may be definable in only 6 or 7 bits. The binary bits not necessary to define the stored information in any register are "0" bits. Further, whenever any of the aforementioned receives information its prior contents are automatically cleared therefrom.

The code register 204 stores eight bits and its contents represent a character type on the bar 2 which may next be printed. As shall be seen the code register 204 stores a representation of every character in the font after each sprocket pulse on the print bar 2 is detected. Only the first six bits stored in the code register 204 are needed to define a character and only these six bits in the register 204 are transmitted through gate 244 and buffer 252 to the D register 254. As noted above the D register 254 stores eight bits and therefore when it receives a character representation from the code register 204 the first six bit positions in the D register represent the character and the two most significant bits in the D register are "0" bits. AND gate 244 is alerted by the 10 function signal also produced by the matrix shown on FIGURE 7.

The start code register 206 also stores eight bits although again only the first six are needed to define a character. These six bits are transmtited via AND gate 246 and buffer 252 to the D register 254. AND gate 246 is alerted by the 11 function signal or the 18 functional signal applied via OR gate 210. The contents of the start code register 206 are changed once for each sprocket pulse received. In general when the print bar 2 is used the contents of the start code register 206 represents the character which will be available for printing in either column 1 or column 2 of the record 8 depending upon whether the print bar 2 is moving left or right.

The print buffer address register 208 may be an eight bit register and stores the values from 1 to 129, each of which represents a different address in the buffer memory 200. The contents of register 208 are transmitted to the D register 254 via AND gate 248 and buffer 252. AND gate 248 is controlled by the 23 function signal which is also produced by the matrix of FIGURE 7. The print buffer address register 208 is used to address all the memory locations in buffer 200 which can be printed as the print bar moves in any one direction.

Also connected to the D register 254 are a plurality of registers 214, 216, 218, 220 and 222 which store constant values. The use of a register to transmit a selected constant value into the D register 254 is for illustration only, since the D register 254 like most electronic registers can be jammed to any desired value by signals selectively applied directly to the elements comprising the register. The register 214 stores the base address in the memory containing the character to be printed in the first column of the record. In this specific embodiment the value stored in register 214 would be a "1," i.e. 00000001. The bits comprising this address stored in register 214 are transmitted through AND gate 240 and through OR gate 242 into the D register 254. AND gate 240 is alerted by either the function signal 32 or 233 applied thereto via OR gate 310. The function signal 32 is generated by the matrix shown in FIGURE 7 and function signal 233 is generated by the matrix shown in FIGURE 8. The function signal 32 is produced after each sprocket signal when the standard bar is moving right. The function signal 233 is produced when the offset bar (FIG. 9) is used at specific positions of that bar.

Register 216 stores the base address plus 1 and in this specific embodiment would specify memory address 2, i.e. 00000010. In particular it should contain the address in the memory of the character to be printed in the first even column, i.e., column 2, on the record 8. The contents of register 216 are transmitted through AND gate 238 via OR gate 252 to the D register 254. AND gate 238 is alerted by the 33 and 232 function signals which are produced by the apparatus of FIGURE 7 and applied to AND gate 238 via OR gate 217. The 33 function table signal is produced after each sprocket signal is generated when the bar is moving left. The function signal 232 is produced by the matrix of FIGURE 8 when the offset bar (FIG. 9) is used at specific positions of that bar. The contents of registers 214 and 216 specify the location in the memory from which the scanning operation should start depending upon whether the print bar is moving left or right.

Figure 8:
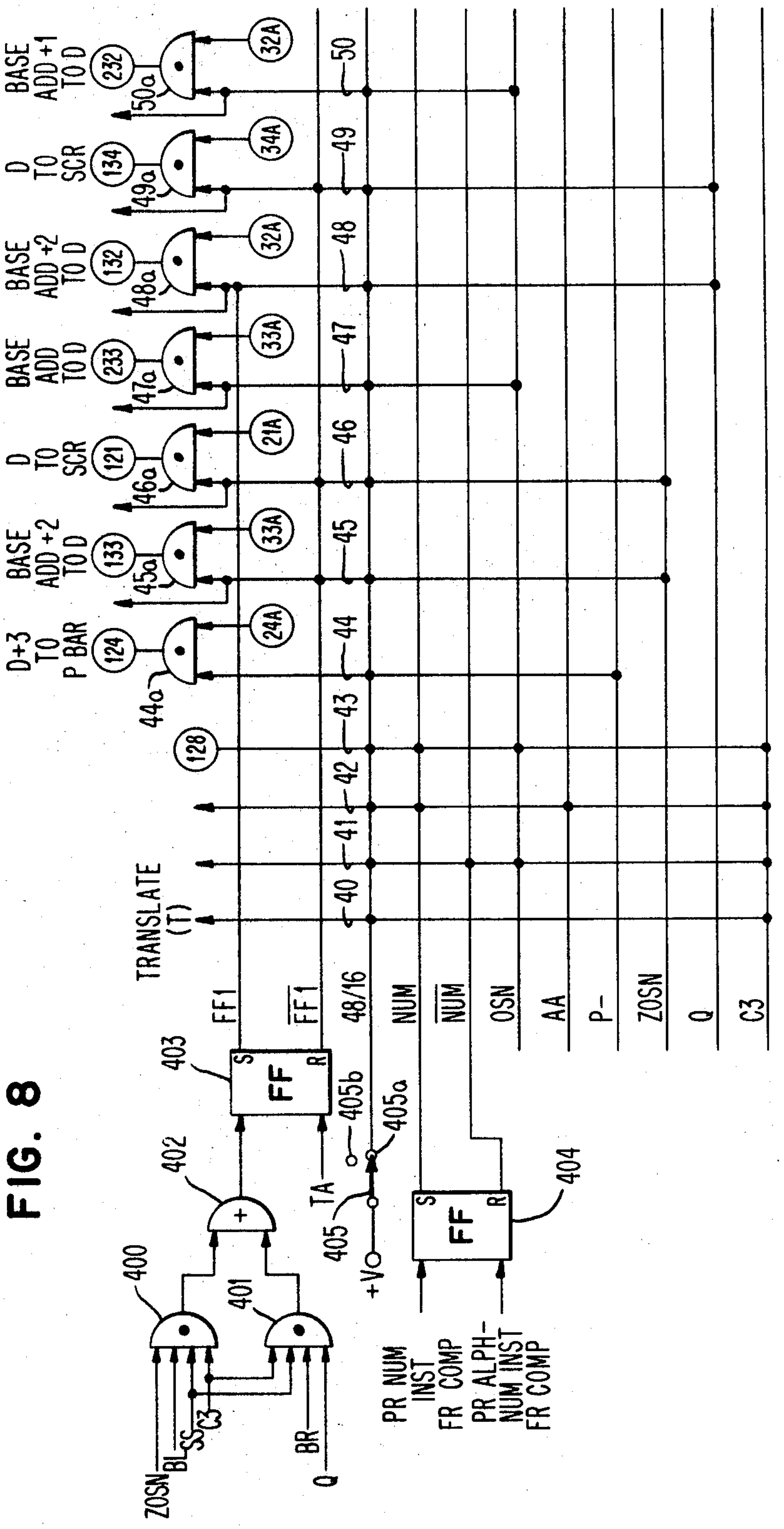
FIGURE 8 is a diagram of the gating matrix used in conjunction with the matrix of FIGURE 7 when the second print bar is employed.

Register 222 stores a binary value equal to the base address plus 2 which in this embodiment would specify address location 3, i.e., 00000011. The contents of this register are transmitted through AND gates 226 and buffers 252 to the D register 254. AND gate 226 is alerted by the 132 and 133 function signals produced by the control apparatus of FIGURE 8, applied via OR gate 312. As indicated previously function signals produced by the apparatus of FIGURE 8 are only generated when the second or offset bar is employed.

Registers 214, 216 and 222 all serve a similar function. They control which location in the memory is addresed immediately after the receipt of a sprocket signal from the print bar. When the standard bar is employed and the bar is moving right odd locations from the memory will be read and the starting address should be memory location 1 stored in register 214. When the bar is moving left even locations are scanned from the memory for each sprocket and the scanning of the memory should start from location 2 which is the values stored in register 216. Register 222 is employed when the second bar or offset bar is used in addition to registers 214 and 216. As shall be later explained in connection with the description and the operation of the printer when the second bar is used the starting address for scanning the memory must be changed as the bar moves in any given direction because of the offset characters on that print bar (see FIG. 9).

Two other registers also are connected to the D register 254. Register 218 stores the value 00000000 which is the representation of the first character in the font. Register 220 stores the value 00111111 which is the representation of the last character in the font. When the bar is turning around and starting to move in a leftward direction it will be appreciated that the first character type in the font will be approaching column 2 of the record. The representation of this first character type is the first one to be compared against the message in the memory. To this end when the print bar starts to move left the representation of the first character in the font is transmitted from register 218 via gate 236 and OR gate 252 to the D register 254. AND gate 236 is alerted by the 12 or 19 function signals which are generated by the control matrix of FIGURE 7 and applied to gate 236 via OR gate 234.

Register 220 serves a function which is similar to register 218 via gate 236 and OR gate 252 to the D register acter in the font to be transmitted via AND gate 242 and OR gate 252 into the D register 254. When the print bar 2 turns around and starts its rightward motion the last character type in the font is the one which will be approaching column position 1 of the record and it is the first character type representation to be compared with a character of the message. To this end AND gate 242 is alerted by the 13 or 20 function signals applied via OR gate 230. These signals are produced by the apparatus of FIGURE 7 immediately after the bar turns around and starts its motion to the right.

It will be appreciated from the foregoing that the D register 254 receives a variety of information. In the main it receives characters of the message from the memory 200; addresses which are ultimately to be used for specifying locations in the memory; and representations of various character types on the print bar.

The contents of the entire D register 254 may be transmitted over cable 257 via AND gate 250 into the memory address register 202. Gate 250 is alerted by the 25 function table signal produced by the apparatus of FIGURE 7. The memory address register 202 in response to information transmitted from the D register 254 will select one of the locations in the memory and will produce a corresponding signal on the lines MAR1 through MAR129. In particular if memory location 2 is selected a signal will also be generated on line MAR2 etc. The MAR129 signal is produced when a location in the memory 200 is addressed that does not contain a character to be printed.

The contents of the entire D register 254 are also applied via cable 255 to one set of inputs of a parallel adder 302. As shall later be explained the D register 254 at various times transfers memory address information into the adder 302 so that it can be suitably modified to cause scanning of all the locations in the memory; transfers data to the adder 302 so that it can be compared to representations of the type font on the print bar and selectively cause printing; and transfers representations of characters on the print bar which are approaching the first, second or third columnar positions of the record 8. These latter representations are delivered to the adder 302 so that they can be modified and represent at any given time the character type on the bar next to approach either cloumn 1, column 2 or column 3 of the record. Finally the D register 254 is used in transferring representations of character types to the adder 302 so that the representation of all the character types may be generated in order for each position of the print bar.

The contents of the D register 254 are at selected times transmitted via cable 259 and AND gate 256 to the B register 258. Only information representing character types on the print bar are transmitted from the D register 254 into the B register 258 via AND gate 256 and cable 259. AND gate 256 is controlled by the 19 function signal which is produced by the control apparatus of FIGURE 7.

B register 258 comprises eight storage elements for storing representations of any character in the sixty-four character font, although only the first six elements are necessary for this purpose. The output of the B register 258 is applied to the B decoder 262 and to complementer 260. The B decoder 262 is used to detect certain representations of the character types of the font on the print bar. In particular when a representation of the first character type in the font on either the standard (FIG. 2) or offset bar (FIG. 9) is in the B register 258, the B decoder 262 produces the FC signal and when a representation of the last character in the font is in the B register 258, the B decoder 262 produces the LC signal. The B decoder 262 is also used to detect when a specific character or set of characters on the offset bar (FIG. 9) is about to be printed or when specific character types are approaching the first or second columns of the record. The signals produced on the output lines of the B decoder 262 labeled P-, Q, OSN, ZOSN and AA are applied to the control matrix of FIG. 8 and are only employed when the offset print bar (FIG. 9) is used.

The B register 258 is also coupled to complementer 260 which operates to complement the eight bits of the values stored in the B register 258 before this value is applied to the adder 302. As indicated above part of the printing operation comprises comparing a character from a specific location in the memory 200 which is to be printed in an associated columnar position of the record 8 with a representation of the character type approaching that columnar position. As shall be explained in detail the D register 254 transmits that character from the memory 200 to a first input of the adder 302 when the B register 258 stores the representation of the character type approaching the columnar position of the record 8 associated with that memory location. The complementer 260 complements the values stored in the B register 258 and applies it via gates 264–1 to 264–8 and OR gate 268 to a second input of the adder 302. If the result of the computation using the contents of the D register 254 and the complemented contents of the B register 258 is zero it indicates that the character from the memory location transmitted via the D register 254 to the adder 302 and the representation of the character type font in the B register 258 are identical. It will be appreciated by those skilled in the art that the contents of the B register 258 are being subtracted from the contents of the D register 254.

The complementer 260 merely acts to invert each of the eight outputs of the B register 258 and forms the 1's complement of the binary value stored in the B register 258. To effect the comparison of the two values in the B register 258 and the D register 254 by a subtract operation, a fugitive 1 or initial carry must be inserted into the adder 302. To this end a single 28 function (FIG. 7) signal is used to insert a pulse representative of an initial carry into the adder 302 when the comparison operation is to take place.

Figure 7:
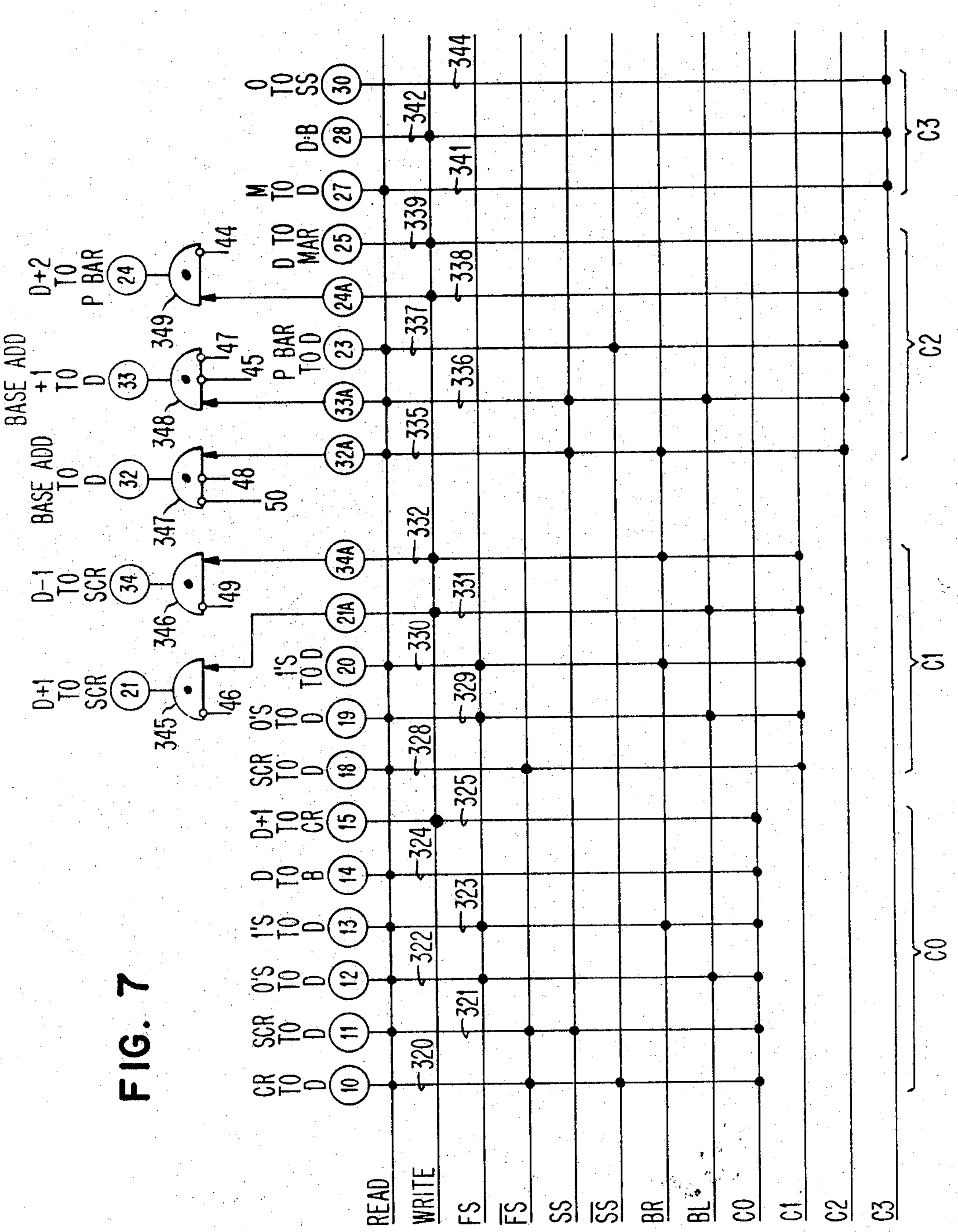
FIGURE 7 is a diagram of the gating matrix used to control the elements of FIGURES 6*a* and 6*b* when the first print bar is employed.

AND gates 264–1 to 264–8 are alerted by the 28 function signal from the matrix of FIGURE 7. Gate 264–6 is also inhibited by the 128 function signal from the matrix of FIGURE 8. Function signal 28 is produced when the standard print bar (FIG. 3) or the offset print bar (FIG. 9) is used and function signal 128 is produced when the offset print bar is used. In the latter case the complemented sixth bit of the contents of the B register is not transmitted to the adder 302 and accordingly the sixth bit input to the adder 302 will appear to be a "0" bit.

Also connected to the second input of adder 302 are registers 278, 279, 280 and 282. These registers store the constant values +2, +3, −1 and +1 respectively in binary form.

The contents (00000001) of register 282 are transmitted to the second input of adder 302 via AND gate 274 and OR gate 268. AND gate 274 is alerted by the output of OR gate 276 which receives the function signals 15 and 21 from the matrix of FIGURE 7.

The contents (11111111) of register 280 are transmitted to the second input of adder 302 via AND gate 272 and OR gate 268. AND gate 272 is alerted by the 34 function signal produced by the apparatus of FIGURE 7.

The contents (00000010) of register 278 are transmitted to the second input of adder 302 via AND gate 270 and OR gate 268. AND gate 272 is alerted by the 24 function signal produced by the apparatus of FIGURE 7.

Finally the contents (00000011) of register 279 are transmitted to the second input of adder 302 via AND gate 281 and OR gate 268. AND gate 281 is alerted by the 124 function signal produced by the control matrix of FIGURE 8.

As in the case registers 214, 216, 218 etc. it will be understood that the contents of these registers 278, 279 etc. are transmitted via cable comprising eight lines to the adder 302 and that each of the gating elements 270, 272 etc. are only one of eight gates. Further it will be understood that registers 278, 279, 280 and 282 are shown to aid in the description of the invention and could be eliminated. Instead the function signal which transmits the values in the register could be directly connected to selected inputs of the adder 302.

The adder 302 has two outputs. The sum of the contents applied to the two inputs of adder 302 is transmitted via cable 305 to AND gates 284, 286 and 288.

AND gates 284, 286 and 288 are connected via cables 285, 287 and 289 to the input of the print buffer address register 208, the code register 204 and the start code register 206 respectively.

AND gate 284 is connected to the output of OR gate 283 which in turn receives the 24 function signal from the matrix of FIGURE 7 and the 124 function signal from the matrix of FIGURE 8. Either of these two latter function signals will alert AND gate 284 to transmit the sum output of the adder 302 to register 208.

AND gate 286 is alerted by the 15 function signal from the matrix of FIGURE 7 and when this function signal occurs the sum output of the adder 302 is transmitted to the code register 204. AND gates 286 only transfer values 000000 to 111111 from the adder 302 to the control register 204. That is, only the first six bits of the adder 302 sum output are transferred to the CR 206. Therefore, when the inputs to the adder 302 are 00111111 and 00000001 the value transmitted to the code register 204 will contain all "0" bits.

Finally AND gate 288 is alerted by the output of OR gate 290 which receives the 21, 34, 121 and 134 function signals. The presence of any one of these function signals causes AND gate 288 to transmit the sum output of adder 302 to the start code register 206. Function signals 21 and 34 are generated by the matrix of FIGURE 7 and function signals 121 and 134 are generated by the matrix of FIGURE 8.

The second output of the adder 302 appears on the single output line 307 whenever the result produced by the adder is zero. This signal will be produced when the contents of D register 254 and the B register 258 are the same and are applied to the adder 302. Output line 307 of adder 302 is a single line and is applied to the input of gate 292. Gate 292 is alerted by function signal 28 and is inhibited, i.e. prevented from transmitting an output, whenever a signal is generated from either gate 41 or 42 (FIG. 8) or an output is produced on the MAR129 line of the memory address register 202.

The output of AND gate 292 is applied to the input of 64 AND gates 296–1 to 296–64. Only AND gates 296–1 and 296–64 are shown. Each of the AND gates 296–1 to 296–64 receives an output from corresponding OR gates 294–1 to 294–64 and each of the OR gates 294–1 etc. receives two adjacent consecutive inputs from the memory address register 202. Thus, OR gate 294–1 receives inputs from the MAR1 and MAR2 output lines from memory address register 202 and OR gate 294–64 receives the MAR127 and MAR128 output lines of memory address register 202. The intermediate OR gates 294–2 to 294–63 (not shown) receive intermediate outputs MAR3 through MAR126 of the memory address register 202. Thus, OR gate 294–2 would receive the MAR3 and MAR4 outputs; OR gate 294–3 would receive the MAR5 and MAR6 outputs from memory address register 202 etc.

The outputs of AND gates 296–1 through 296–64 are connected respectively to the set inputs of column driver flip-flops 298–1 through 298–64. The reset inputs of each of these 64 column flip-flops is connected to the output of AND gate 118 on FIGURE 4.

The MAR signals are produced when the print buffer memory 200 is addressed and these MAR signals indicate which address in the memory is presently being accessed. Thus, when the contents of either memory location 1 or 2 is transferred to the D register and is the same as the character type representation in the B register 258, gate 296–1 will be alerted by the output of OR gate 294–1 to transmit the signal on adder 302 output line 307 to the set input of column driver flip-flop 298–1. In like manner column driver flip-flops 298–2 through 298–64 will be set in response to the output signal on line 307 as the buffer memory 200 is addressed by memory address register 202.

The set output of the column driver flip-flops 298–1 through 298–64 are connected via differentiators 300–1 through 300–64 to the actuating coils 31 (FIG. 2) of the 64 print hammers associated with the 128 columns of the record 8. When the fire pulse is produced by AND gate 118 all those column driver flip-flops which have been set will be reset. The differentiators connected to the set outputs of those flip-flops will produce at that time an output pulse to selectively drive the print hammers of FIGURE 2. Column driver flip-flop 298–1 controls the print hammer associated with columns 1 and 2 of the record and column driver flip-flop 298–64 controls the print hammers associated with columns 127 and 128 of the record 8. The intermediate column driver flip-flops 298–2 to 298–63 are similarly associated with the intermediate print hammers and columns of the record 8.

Refer now to FIGURE 7 which shows the control matrix for producing function signals 10 to 15, 18 to 21, 23 to 25, 27, 28, 30, and 32 to 34. Each of the vertical lines on FIGURE 7 represents an AND gate and each of the dots on a vertical line represents a connection to that AND gate. The matrix of FIGURE 7 comprises AND gates 320 to 325, 328 to 332, 335 to 339, 341 to 342 and 344. The vertical lines on FIGURE 7 represent inputs to these AND gates. Input lines are connected to an AND gate at those points where a dot appears at the intersection of a vertical and horizontal line. Thus, for example, the read input produced by binary counter 150 (FIG. 4) is applied to AND gates 320, 321, 322, 323, 324, 328, 329, 330, 335, 336, 337 and 341. The remaining inputs to the matrix of FIGURE 7 will not be described in detail except to indicate where these signals are generated.

The read and write signals are generated from binary counter 150 (FIG. 4). The FS and $\overline{FS}$ signals are produced by flip-flop 90; the SS and $\overline{SS}$ signals are produced by flip-flop 116; the BR and BL signals are produced by flip-flop 92 and the C0, C1, C2 and C3 count signals are produced by cyclic counter 146. All the aforementioned elements have been discussed in connection with FIGURE 4.

Some of the function signals shown on FIGURE 7 are not directly produced by the AND gates of that matrix. Function signals 21 and 34, for example, are produced by the outputs of gates 331 and 332 via AND gates 345 and 346. These two gates are in turn inhibited by the outputs of AND gates 46 and 49 of the control matrix shown in FIGURE 8. The outputs of gates 331 and 332 which are labeled 21A and 34A are applied as control signals to the apparatus shown in FIGURE 8. In addition, function signals 32, 33 and 24 are produced in response to signals from gates 335, 336 and 338 via AND gates 347, 348 and 349 respectively. AND gates 335, 336 and 338 produce the 32A, 33A and 24A signals which are applied also to the matrix of FIGURE 8. AND gates 347, 348 and 349 are also inhibited by signals from the gates of FIGURE 8. In particular AND gate 347 is inhibited by the output of AND gates 48 and 50; AND gate 348 is inhibited by the outputs of either AND gates 45 or 47; and AND gate 349 is inhibited by the output of AND gate 44.

An examination of FIGURE 7 shows that the function signals 10 to 15 are produced when the cyclic counter 146 is at a count of C0; the function signals 18 to 21 and 34 are produced when the cyclic counter 146 is at a count of C1; the function signals 23 to 25, 32 and 33 are produced when the cyclic counter 146 is at a count of C2; and the function signals 27, 28 and 30 are produced when the cyclic counter 146 is at a count of C3. Further the 21A and 34A signals produced at a count of C1 and the 24A, 32A and 33A are produced at a count of C2.

Above each of the function signals on FIGURE 7 there is a short statement indicating the purpose of that function signal. Thus, for example, the 10 function signal causes the contents of a control register 204 to be transferred into the D register 254 and the 19 function signal causes the D register 254 to receive the value of all 0's; the 25 function signal causes the contents of the D register 254 to be transferred into the memory address register 202 and the 28 function signal causes the contents of the D register 254 to be compared by the adder 302 with the contents of the B register 258.

Refer now to FIGURE 8 which is a control matrix used in controlling the printer when the offset print bar (FIG. 9) is used. This matrix of FIGURE 8 is used in conjunction with the matrix of FIGURE 7 to generate all the control signals necessary when the offset print bar is in use as well as to prevent certain of the function signals which would normally be developed by the apparatus of FIGURE 7 when the offset bar is in use. The matrix of FIGURE 8 comprises 11 AND gates 40 through 50. Each of these AND gates is represented by a vertical line. The horizontal lines of FIGURE 8 represent the inputs of these AND gates. An AND gate receives an input at any intersection which has a dot thereat. Thus, for example, all the AND gates 40 through 50 are connected to receive the 48/16 signal.

Gate 40 produces the translate (T) signal which is applied to AND gates 304 and 306 at the input of translator 212 of FIGURE 6*a*. Gates 41 and 42 produce signals that are applied to inhibit gate 292 of FIGURE 6*b*. The matrix of FIGURE 8 produces the 128, 124, 133, 121, 233, 132, 134 and 232 function signals all of which are applied to control the flow of information in the apparatus shown in FIGURE 6. None of the aforementioned function signals except the 128 function signal are produced directly by the AND gates of FIGURE 8. The function signals 124, 133, 121 etc. require that certain of the gates from FIGURE 7 produce an output. Thus, for example, in order to generate the 124 function signal an output must be produced by AND gate 44 and the 24A signal must be available from gate 338 on FIGURE 7. AND gates 44 through 50 are connected to the inputs of AND gates 44*a* through 50*a*. It is these latter AND gates 44*a* to 50*a* which produce the 124, 133, 121, 233, 132, 134 and 232 function signals.

The input signals to the matrix of FIGURE 8 are applied via the horizontal lines labeled C3, $\overline{F1}$, and F1 signals, 48/16, NUM, $\overline{NUM}$, and five lines which receive signals applied by the B decoder 262 of FIGURE 6. These five lines transmit the OSN, AA, P, ZOSN and Q signals of the B decoder 262. These latter five signals are generated when the offset print bar (FIG. 9) is used and certain of the characters thereon are either about to be printed or are advancing to the first, second or third columnar positions of the record 8.

The input signals $\overline{FS1}$ and FS1 are produced from the reset and set output respectively of flip-flop 403. This flip-flop is reset each time the turnaround signal (TA) is produced by resettable delay flop 96. Flip-flop 403 is set by a signal produced from the output of OR gate 402. OR gate 402 in turn receives at its input the output of AND gates 400 and 401. AND gates 400 and 401 each receive the SS signal from flip-flop 116 (FIG. 4) and a C3 count signal from the cyclic counter 146. In addition AND gate 401 receives the BR (bar right) signal from flip-flop 92 (FIG. 4) and the Q signal from the B decoder 262 (FIG. 6). Further, gate 400 also receives the BL (bar left) signal from flip-flop 92 and the ZOSN signal from the B decoder 262.

The 48/16 signal is produced in response to the operation of switch 405. This switch is closed to contact terminal 405*a* whenever the offset bar is to be used. When the switch 405 contacts terminal 405*a* all the AND gates 40 to 50 on FIGURE 8 are alerted. Switch 405 may be operator controlled or in the alternative may represent the output of a flip-flop which can be program controlled from a computer. When the standard bar (FIG. 2) is used the switch 405 contacts terminal 405*b*, that is, the energizing voltage is removed from the line marked 48/16.

The NUM and the $\overline{\text{NUM}}$ signals are produced at the set and reset outputs of flip-flop 404. Flip-flop 404 is reset in response to an instruction from a computer (not shown) which indicates that essentially only numeric characters are to be printed when the offset bar (FIG. 9) is used. The flip-flop 404 is reset by an instruction from the computer when both alphabetic and numeric characters on the second print bar (FIG. 9) are to be used.

The C3 count signals to AND gates 41, 42 and 43 are applied from cyclic counter 146 (FIG. 4).

All the function signals from FIGURE 8 are produced in synchronism with the count signals from counter 146. This is true because the AND gates 44*a* to 50*a* require signals from the matrix of FIGURE 7 and all these signals are in turn controlled by the count signals from counter 146. In particular the 24A, 32A and 33A signals which control gates 44*a*, 45*a*, 47*a*, 48*a* and 50*a* are all produced when the C2 count signal is present. Accordingly, function signals 124, 133, 233, 132 and 232 are selectively produced at that time. AND gates 46*a* and 49*a* are controlled by the 21A and 34A signals from the matrix of FIGURE 7. The 21A and 34A signals are produced when the C1 count signal is present. Accordingly, function signals 121 and 134 are also selectively produced at that time.

Figure 9:
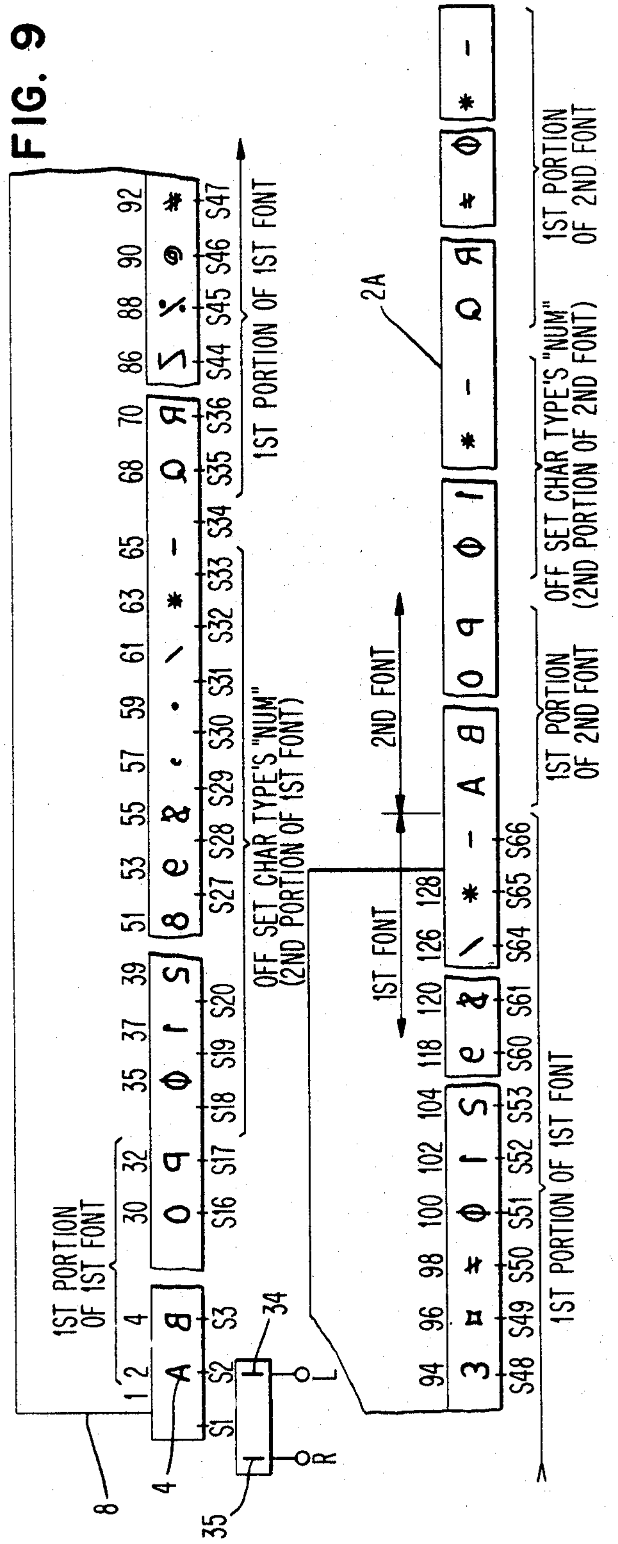
FIGURE 9 shows details of the second print bar.

Refer now to FIGURE 9 which shows the second or offset bar 2A, the record 8 and the pair of in line read heads 34 and 35. As in the case of the first print bar 2 described above there are two complete sets of font on the offset print bar 2A. The position of read heads 34 and 35 remains as previously described, with head 34 in line with column 2 of the record 8 and head 35 to the left three column positions. In describing print bar 2A it will be assumed that it is moving left and that the second sprocket S2 is in line with head 34.

Each one of the fonts on the print bar 2A comprises 64 character types and is made up of two portions. The first portion is called the alpha-numeric portion and comprises 48 character types, A through P, Q through Z, %, @, #, & □, ≠, ϕ through 9, $, ', ·, /, * and -. As shown in FIGURE 9 the character types of the alpha-numeric portion of the first font are in line with the even column positions of the record 8.

The second portion of the font is called the offset portion and comprises 16 character types 4 including the numerals ϕ through 9 and symbols $, ·, /, * and -. As shown in FIGURE 9 the character types 4 of the second portion of the font are offset with regard to the character types of the alpha-numeric portion and are in line with the odd column positions of the record 8. The character types 4 within both portions of the font on bar 2A are positioned so that there is one column space between each character type. However, between the letter P (in the first portion of the font) and the numeral ϕ (first character in the second portion of the font) are two character spaces. The same distance is maintained between the symbol- (last character in the second portion of the font) and the letter Q.

As the bar 2A moves left, each time a sprocket is detected by the head 34 the character types from the alpha-numeric or first portions of the fonts on bar 2A will be in line with the even columns of record 8 and the character types of the second or offset portion of the fonts will be in line with the odd columns on the record 8. From the descriptive matter given previously it will be readily appreciated that the reverse condition is obtained when the bar 2A is moving right. That is, each time a sprocket is detected by head 35, the character types from the alpha-numeric portions of the fonts on bar 2A will be in line with the odd columns of the record 8 and the character types of the offset portions of the fonts will be in line with the even columns on the record 8.

There are 66 sprockets S1 to S66 associated with the first font on print bar 2A. Sprocket S1 is two column positions to the left of the first character type "A" on the bar 2A. Further each of the character types in the alpha-numeric portion of the first font has a sprocket directly in line therewith and an additional sprocket S34 in two columns to the left of the character type "Q." Each character type in the offset portion of the first font has a sprocket one column position to the left thereof. The sprockets S1 to S66 are detected by the read heads 34 and 35 which produce the L and R signals. These signals are applied to the control apparatus of FIGURE 4 already described.

The complete set of 64 characters of the font including both portions are set out on the bar 2A in the following character order: alpha-numeric portion comprising character types A through P; offset portion comprising character types ϕ through -; and alpha-numeric portion comprising the character types Q through -. Each of these characters is represented by a binary value. The first character in the font (A) is represented by the binary value 000000 (or zero) and the last character in the font (-) is represented by the binary value 111111 (or 63). The intermediate characters of the font are likewise represented by intermediate binary values according to their relative order in the font, i.e. according to their position on the print bar 2A. For example, the code for the numeral "1" in the offset or second portion of the font is 010001 and the code for numeral "1" in the first portion of the font is 110001.

Figure 10:
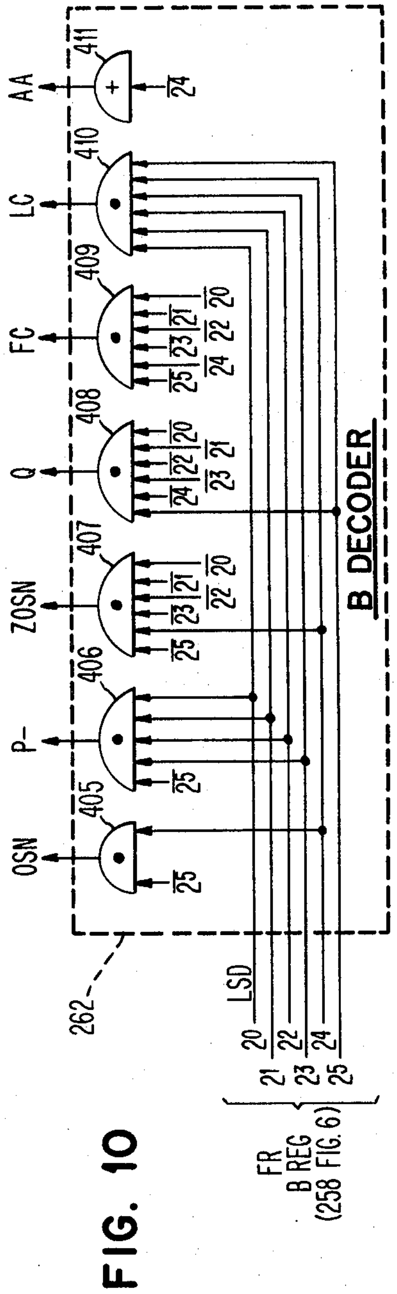
FIGURE 10 is a more detailed block diagram of the B decoder of FIGURE 6*b*.

Refer now to FIGURE 10 which is a detailed block diagram of the B decoder 262. The B decoder 262 comprises six AND gates 405 to 410 and one OR gate 411. The B decoder 262 receives six of the eight output lines from the B register 258. That is, it receives the output lines carrying the least significant six bits of the value in the B register 258. These six bits are all that are necessary to define a character in the font according to its relative position on the print bar. The six output lines from the B register 258 are labeled $2^0$ to $2^5$ and a signal representative of a one bit on any of these lines will have a binary value according to the line it is on. Likewise, a zero bit on any of the lines indicates that absence of a value associated with that line. If a one bit is present on any line, e.g. line $2^3$, then by convention that signal, i.e. $2^3$ is present; if a zero bit is present on any line, e.g. $2^3$, then by convention the signal $\overline{2^3}$ is present.

Gate 405 receives the $\overline{2^4}$ and $\overline{2^5}$ signals from the B register 258 and produces the OSN (offset numeric) signal at its output. AND gate 405 is operative in response to all codes in the B register 258 which have a zero in the sixth bit and a one in the fifth bit position, notwithstanding the values in the first four bit positions. That is, AND gate 405 produces the OSN signal for each of the sixteen codes having the values from 010000 to 011111. These codes are representative of the sixteen character types in the offset portion of the print bar 2A.

AND gate 406 receives the $2^5$, $2^3$, $2^2$, $2^1$ and $\overline{2^0}$ bits from the B register 258 and produces the P— signal at its output. In particular, gate 406 is operative in response to the binary values 001111 or 011111 which are representative of the character types from the first portion of the fonts and the symbol - from the offset portion of the fonts on print bar 2A.

AND gate 407 receives the $\overline{2^5}$, $\overline{2^4}$, $\overline{2^3}$, $\overline{2^2}$, $\overline{2^1}$ and $\overline{2^0}$ signals from the B register 258 and produces in response thereto the ZOSN (zero offset numeric) signal. In particular, gate 407 produces the ZOSN signal in response to the values 010000 which represents the type zero in the offset or numeric portion of the font.

Gate 408 receives the $\overline{2^5}$, $\overline{2^4}$, $\overline{2^3}$, $\overline{2^2}$, $\overline{2^1}$ and $\overline{2^0}$ signals from the B register 258 and produces the Q signal. In particular, gate 408 responds to the value 100000 which is representative of the character type "Q" on the bar 2A.

AND gate 409 receives the $\overline{2^5}$, $\overline{2^4}$, $\overline{2^3}$, $\overline{2^2}$, $\overline{2^1}$ and $\overline{2^0}$ signals from the B register 258 and produces in response thereto the FC (first character) signal. In particular AND gate 409 responds to the value 000000 which is representative of the first character in the font on either bar 2 or 2A.

AND gate 410 receives the $2^5$, $2^4$, $2^3$, $2^2$, $2^1$ and $2^0$ signals from the B register and produces the LC (last character) signal. That is, AND gate 410 responds to the value 111111 to produce the LC signal. The value 111111 represents the last character on the font when either the bar 2 or 2A is used.

Finally, buffer 411 receives the $\overline{2^4}$ signal from the B register 258 and produces the AA (any alphabetic) signal in response thereto. In particular, buffer 411 produces the AA signal in response to any code having a zero bit in the fifth bit positions thereof. That is, the output AA is produced whenever the codes for the character types A through P and Q through Z, %, @, #, &, □, and ≠ from the first portion or alpha-numeric portion of the fonts are in the B register 258.

As shall be seen the outputs from AND gates 409 and 410 which produce the first character and last character signals are used when either the standard bar 2 of FIGURE 2 or the offset bar 2A of FIGURE 9 is in operation. The outputs from AND gates 405 through 408 and OR gate 411 are only used when the offset bar 2A of FIGURE 9 is employed.

OPERATION

The operation of the instant printing mechanism will now be described. Three modes of operation will be discussed. In the first mode the standard bar is used and alphabetic and numeric characters are printed. In the second mode the offset bar is used and again alphabetic and numeric characters are printed. The printing rate for the first and second modes of operation is the same. However, the number of different alphabetic and numeric characters that can be printed in the second mode when the offset bar is used is less than the number of different characters that can be printed in the first mode, i.e. when the standard bar is used. In the third mode of operation the offset bar is again used but only a limited portion of the font (previously designated the offset portion) is printed. The printing rate in the third mode of operation is increased by a factor of two over the printing rate in either the first or second modes of operation.

THE FIRST MODE OF OPERATION

Assume now that the standard print bar 2 of FIGURE 3 is in the printing mechanism (FIG. 1) and that the 128 locations of the print buffer memory 200 (FIG. 6) have been previously loaded.

It will be appreciated that prior to the time the print order is transmitted by the computer or other external device (not shown) the print bar 2 will be constantly moving to and fro across the record 8. Sprockets S1 etc. on the print bar 2 will be detected by heads 34 and 35. These heads 34 and 35 produce sprocket pulses which are transmitted through amplifiers 80 and 82 (FIG. 4), OR gate 84, trailing edge detector 94 to the resettable delay flop 96. However, when the print bar periodically changes direction the sprockets S1, etc. will not be detected and the resettable delay flop 96 produces the turnaround signal shown in line 2 of FIGURE 4*a*. Each such turnaround signal is applied to set the run flip-flop 91 and is applied to AND gates 86 and 88 so that the bar direction flip-flop 92 may be toggled to indicate the direction of the print bar 2.

When the print instruction from the computer (not shown) is generated AND gate 104 (FIG. 4) is alerted and end flip-flop 122 is reset. The remaining input to AND gate 104 is the turnaround signal and this is produced as the print bar 2 is changing direction. For descriptive purposes only it will be assumed at this time that the print bar 2 has completed its travel across the record 8 in the right direction and is turning around to move leftward across the record 8 (see FIG. 3*a*). The turnaround signal produced at this time causes AND gate 104 to transmit a signal to cause the computer to remove the print instruction signal and to set the print flip-flop 106 which in turn alerts gates 108, 120 and 118 on FIGURE 4. In addition, the turnaround signal sets run flip-flop 91; flip-flop 90 (which produces the FS signal) alerts gates 86 and 88 at the set and reset inputs of the bar direction flip-flop 92.

As the print bar 2 continues to move left read head 34 (FIG. 2 and FIG. 3*a*) detects the sprocket S1 and produces a pulse which is transmitted through amplifier 82 (FIG. 4), OR gate 84 and trailing edge detector 94 to reset the resettable delay flop 96. The pulse from amplifier 82 also is transmitted through AND gate 88 to reset the bar direction flip-flop 92 which in turn produces the bar left (BL) signal. The bar left (BL) signal is supplied to AND gate 100 in time to allow this first sprocket pulse, which is also applied to this AND gate 100 to be transmitted thereby and OR gate 102 to the input of trailing edge detector 114 and to one input of the AND gate 118. As explained previously in connection with FIGURE 4 additional sprocket pulses produced either by read head 34 or read head 35 as the print bar 2 continues to move left will not be transmitted through AND gates 86 and 88 until the next turnaround signal is produced by resettable delay flop 96. Further, as previously explained, only sprockets produced by head 34 will be transmitted via OR gate 102 since the bar direction flip-flop alerts only AND gate 100 when the bar is moving left. AND gate 98, which transmits sprocket pulses from the head 35, is not alerted when the bar 2 is moving left.

The output from OR gate 102 is not transmitted through AND gate 118 because flip-flop 90 is not producing the $\overline{\text{FS}}$ signal which is needed to alert AND gate 118. However, the output pulse from gate 102, which is produced in response to the detection of sprocket S1 by head 34, is transmitted through trailing edge detector 114. The trailing edge of this first sprocket pulse (as well as each of the other sprocket pulses generated as the bar 2 is moving left) is applied by detector 114 to one input of AND gates 120 and 108 and to the set input of flip-flop 116. In response to this signal from the trailing edge detector 114 the flip-flop 116 produces the SS signal and AND gate 108 transmits a signal to the set input of flip-flop 112 which produces the scan signal. AND gate 108 transmits a signal because the three signals applied thereto are simultaneously present, i.e. the print and run signals from flip-flops 106 and 91 respectively are present and when the trailing edge detector 114 produces a pulse, AND gate 108 responds to set the scan flip-flop 112. AND gate 120 does not transmit a signal because the $\overline{\text{run}}$ signal (from flip-flop 91) applied to another of its inputs is not yet available.

As previously explained binary counter 150, in response to pulses from oscillator 148, constantly produces the read and write pulses. The first write pulse produced after flip-flop 112 is set is transmitted through AND gate 142 to trailing edge detector 144 and the trailing edge of this write pulse is applied to step cyclic counter 146. As shall be shown the cyclic counter 146 produces its series of outputs a number of times for each sprocket pulse. However, when the cyclic counter 146 is not cycling flip-flop 166 (FIG. 5) in the last stage thereof is set. Consequently, the first write pulse transmitted via AND gate 142 and trailing edge detector 144 causes the cyclic counter 146 to be stepped to a count of C0.

FIRST MEMORY SCANNED AFTER TURNAROUND SIGNAL (TA)

Since the cyclic counter 146 is stepped by the trailing edge of the wire pulse the C0 signal is first produced as the read pulse from binary counter 150 is present. The C0 signal and the read pulse alert gates 320 through 324 of the matrix shown in FIGURE 7.

It will be understood that the print bar 2 is approaching a position where the first letter, @, may be selectively printed in column 2 of the record 8 and the remaining 63 characters of the font may be selectively printed in the remaining even columns of the record 8. During the first memory scan the code (000000) for the first character type @ in the font will be compared with the character representation in the second location (i.e., first even location) in the memory 200; then the code (000001) for the character type A in the font will be compared with the character representation in the fourth location in the memory 200; etc. This process will go on until the code (111111) for the 64th character type ,?, is compared with the character representation in location 128 in memory 200. During the operation wherever comparison is obtained between a character representation in a memory location and the character type approaching the corresponding position on the record a flip-flop controlling the print hammer for the corresponding column position is set (see FIG. 2). The printing operation, i.e. the firing of the print hammers, will take place when the second sprocket S2 is detected by head 34. The second sprocket S2 will also start a new memory scan.

In order to perform the operations briefly described in the preceding paragraph the cyclic counter 146 must cycle sixty-four times for each sprocket pulse produced. Only on the first of these sixty-four cycles are all four counts C0, C1, C2 and C3 produced by counter 146. On the remaining 63 cycles only the counts C0, C2 and C3 are produced.

The events occurring during the first cycle of counter 146, after a turnaround signal is produced and the first sprocket, S1, is detected by head 34 (FIG. 3*a*) will now be described. As indicated above the counter 146 was stepped to C0. The C0 count signal and the read signal from binary counter 150 alert AND gates 320 through 324 in the matrix of FIGURE 7. Of these aforementioned elements only AND gates 322 and 324 will produce function signals. Gate 322 produces the 12 function signal in response to the read signal; the bar left signal from flip-flop 92; the FS signal from flip-flop 90 and the C0 count signal. The flip-flop 90 was set by a turnaround signal to produce the FS signal and the bar direction flip-flop was set to produce the BL signal when the print bar 2 began moving left. AND gate 324 produces the 14 function signal in response to the read signal and the C0 count signal both of which are available at this time.

The 12 function signal alerts AND gate 236 (FIG. 6*a*) via OR gate 234 to allow zeros stored in register 218 to be transmitted via AND gate 236 and OR gate 252 into the D register 254. The value zero is representative of the first letter @ on the print bar 2. The 14 function signal renders AND gate 256 operative which transmits this value from the D register 254 via cable 259 into the B register 258. However, the D register 254 retains the representation of the first character, @, on the print bar 2 and is not cleared out when the transfer is made via AND gate 256.

When the read signal terminates, the write signal is produced by binary counter 150. The write signal in combination with the C0 output of cyclic counter 146 causes AND gate 325 (FIG. 7) to produce the 15 function signal. The 15 function signal is transmitted via OR gate 276 to one input of AND gate 274 (FIG. 6*b*). The other input of AND gate 274 receives the constant value, plus 1, from register 282. AND gate 274 transmits this value via OR gate 268 to one input of adder 302. The other input of adder 302 is connected via cable 255 to receive the contents of the D register 254 which at this time stores the value 00000000 representative of the first character, @, on the bar 2. The sum output of adder 302 is transmitted via cable 305 to the input of gate 286 which is also alerted by the 15 function signal. The sum output of the adder is now equal to a value of 00000001 which is representative of the second character type, A, in the font on the print bar 2. This value is transmitted via gate 286 and cable 287 to the control register 204. At the end of the write pulse, trailing edge detector 104 (FIG. 4) transmits a pulse to step the cyclic counter 146 to a count of C1.

From FIGURE 5 it will be observed that the differentiated output from the first stage flip-flop 160 of counter 146 is transmitted via AND gate 180 to the input of the second stage flip-flop 162 rather than to the third stage flip-flop 164 via AND gate 178. This is true because the SS signal is present to alert AND gate 180. Hence, the step pulse from detector 144 now causes the count to shift from C0 to C1.

The following read pulse and the C1 output from counter 146 alert AND gates 328, 329 and 330 (FIG. 7). Of these three gates only AND gate 329 receives signals at all of its inputs; namely read, FS, BL and C1 and produces the 19 function signal. The 19 function signal is applied via OR gate 234 (FIG. 6*a*) to AND gate 236 which again transmits the value representative of the first character on the bar 2 into the D register 254 via OR gate 252.

The write pulse appearing on a count of C1 alerts gates 331 and 332 (FIG. 7); however, only gate 331 receives signals at all of its inputs and produces the 21A output signal. The 21A signal is produced by gate 331 in response to the write, BL and C1 signals. The 21A signal is applied to the input of AND gate 345 which produces in response thereto, the 21 function signal. Gate 345 is inhibited by an output from gate 46 in the matrix of FIGURE 8. However, when the standard print bar 2 is used no signals are generated by the martix of FIGURE 8. The 21 function signal is applied via OR gate 276 (FIG. 6*b*) to AND gate 274 which transfers the constant value plus 1 from register 282 to one input of the adder 302 via OR gate 268. The remaining input of the adder 302 is derived from the D register via cable 255. The sum output of the adder 302 available on cable 305 is equal to a value of 00000001 and represents the second character type, A, on the print bar 2. Cable 305 is connected to AND gate 288 which is also alerted by the 21 function signal applied via OR gate 290. The output of gate 288 is transmitted via cable 289 to the input of the start code register 206. Therefore, the start code register 206 also at this time will be storing a representation of the second character type in the font in line with sprocket S3. That is, after a sprocket is detected the SCR register 206 stores a representation of the character type which is 2 characters away from that sprocket.

As before the trailing edge of the write pulse sensed by the trailing edge detector 144 causes the cyclic counter 146 to shift now to a count of C2. The read signal produced during the count of C2 alerts AND gates 335, 336 and 337 (FIG 7). Of these three AND gates only AND gate 336 receives signals on all its input lines namely; read, SS, BL and C2. The SS signal is derived from the set output of flip-flop 116 which had previously been conditioned to produce the SS signal by an output from OR gate 102 in response to the detection of the first sprocket S1. AND gate 336 produces the 33A signal which is transmitted through AND gate 348 and appears as the 33 function signal. Gate 348 can be inhibited by outputs from AND gates 45 or 47 of FIGURE 8.

The 33 function signal is applied via OR gate 217 (FIG. 6*a*) to the input of AND gate 238 which transmits the base address plus 1 from register 216 via the OR gate 252 to the D register 254. As indicated above, the constant value stored in register 216 is equal to two (00000010). The write pulse generated during a count of C2 causes AND gates 338 and 339 to produce the 24A signal and 25 function signal, respectively. The 24A signal is transmitted via gate 349 which in turn produces the 24 function signal. AND gate 349 can be inhibited by the output of gate 44 from FIGURE 8.

The D register 254 (FIG. 6*a*) is connected to the memory address register 202 via cable 257 and AND gate 250. This gate is rendered operative by the 25 function signal so that the value 2 (00000010) in the D register 254 is transmitted into the memory address register 202 to specify and address the first even location in the memory 200.

The 24 function signal renders gate 270 (FIG. 6*b*) operative to transmit the constant value plus 2 from register 278 via OR gate 268 to one input of adder 302. The other input to the adder 302 is derived from the D register 254 via cable 255. The sum (a value of 4) produced by the adder 302 is transmitted via cable 305 to one input of AND gate 284. Function signal 24 also renders gate 284 operative via OR gate 283 and the sum just produced by the adder 302 is transmitted from AND gate 284 via cable 208 to the print buffer address register 208.

At this point the print buffer address register 208 is storing a value which will be used when the cyclic counter 146 goes through another cycle of operation to specify the next address (even) in the memory to be accessed; the control register 204 contains a representation of the character type approaching the columnar position on the record 8 associated with the next even address (i.e. location 4) in the memory; and the start code register 206 contains a representation of a character type on the bar 2 which may be printed in the first even column on the record after the next sprocket, i.e. S2 (FIG. 3*a*) is detected.

As before the trailing edge of the write pulse steps the cyclic counter 146; now to a count of C3. The next read pulse in combination with the C3 count renders AND gate 341 (FIG. 7) operative which in turn produces the 27 function signal. The 27 function signal is applied to AND gate 306 which transmits the contents of the memory location specified by the value (00000010) in memory address register 202 to the D register 254 via OR gate 252. At this time the location addressed in memory 200 is the second location therein which contains the character to be printed in the first even column of the record 8. AND gate 306 can be inhibited by the T signal which is generated by the control matrix of FIGURE 8.

During the count of C3, the next write pulse from binary counter 150 causes gate 342 to produce the 28 function signal. The 28 function signal is applied to one input of AND gates 264–1 to 264–8. Each of these AND gates also receives one of the bits stored in the B register 258 via cable 259 and complementer 260. It will be understood that since the output of the B register 258 is applied via complementer 260 to gates 264–1 etc. that wherever a one bit appears in the code stored in the B register 258, complementer 260 will change that one bit to a zero bit. In other words the complementer 260 forms the 1's complement of the value in the B register 258 and applies it to the input of gates 264–1 to 264–8. The outputs of these AND gates are transmitted via OR gate 268 to the input of adder 302. Antoher input of the adder 302 receives the contents of the D register 254 via cable 255. From the above description it will be appreciated that, at this time, the D register 254 is storing the contents of second location in memory 200 which represents the character to be printed in the second column of the record and the B register 258 stores a representation of the character type approaching the second column of the record 8. These two values are transmitted to the adder 302 which effectively subtracts the value stored in the B register 258 from the value stored in the D register 254. In order that that this subtract operation takes place the 28 function signal is applied to the adder to insert a fugitive 1 into the computation so that the 2's complement the value in the B register 258 is added to the value in the D register 254. If the contents of the B register 258 and the D register 254 are the same an output is produced on line 307 which is applied to single AND gate 292. AND gate 292 is also rendered operative by the 28 function signal and can be inhibited by the MAR129 signal from the address register 202 and outputs from either gates 41 or 42 from the matrix of FIGURE 8. If the character representations in the B register 258 and D register 254 are the same gate 292 will transmit a signal to one input of 64 gates 296–1 to 296–64. However, only one of these gates will transmit a signal from the output of AND gate 292. In this case AND gate 296–1 is rendered operative by an output from OR gate 294–1. In particular, OR gate 294–1 transmits the MAR2 signal to render AND gate 296–1 operative. The MAR2 signal is produced when the second location in memory 200 is addressed. An output from AND gate 296–1 is applied to the set input of flip-flop 298–1 which for the time being stores the fact that comparison was obtained between the representation of the character stored in location 2 of memory 200 and the representation of the character type approaching column 2 of the record 8.

Also during the count of C2 AND gate 344 (FIG. 7) produces the 30 function signal which is used to reset both flip-flops 90 and 116 of FIGURE 4. Accordingly, after the first cycle of counter 146 the FS and SS signals are removed and the $\overline{FS}$ and $\overline{SS}$ signals are generated by flip-flops 90 and 116, respectively. It is preferable that the 30 function signal not be a DC signal but be a pulse suitable for resetting flip-flops 90 and 116 of FIGURE 4. This can easily be obtained by inserting a differentiator between the output of AND gate 344 and the reset inputs to the aforementioned flip-flops.

During the aforementioned operations that took place during the counts of C0 through C3, the print bar 2 has moved only a very small distance to the left and still occupies substantially the same position as shown in FIGURE 3*a*. The trailing edge of the write pulse from binary counter 150 again, in the manner previously described causes the cyclic counter to be stepped now back to a count of C0. In the second cycle of operation and the ones to follow, the count of C1 from cyclic counter 146 is skipped. During the second cycle for counter 146 the contents of memory location 4, i.e. character to be printed in the fourth column of the record 8 will be compared, against the letter A which is approaching the fourth column of the record. During this count of C0 (in the second cycle as well as the ones to follow) the same signals previously generated do not appear because the FS signal is no longer available and instead the $\overline{FS}$ signal controls the gates of the matrix of FIGURE 7. In particular, when the read signal is applied AND gates 320 and 325 produce the 10 and 14 function signals. AND gate 320 receives the read, $\overline{FS}$, $\overline{SS}$ and C0 count signals and AND gate 324 receives the read and C0 count signals. None of the remaining gates 321 to 323 alerted by the read and C0 signals produces an output at this time since at least one of the remaining necessary signals on each of these AND gates is not present.

The 10 function signal activates gate 244 (FIG. 6*a*) to transfer the contents of the control register 204 via OR gate 252 to the D register 254. As noted above control register 204 at this time stores the representation (00000001) of the second character type (A) on the bar 2 which is approaching column 4 of the record. The 14 function signal allows the contents of the D register 254 representative of a character type to be transmitted through AND gate 256 into the B register 258.

The following write pulse from counter 150 (FIG. 4) causes AND gate 325 (FIG. 7) to produce the 15 function signal which in turn alerts AND gate 274 (FIG. 6b) via OR gate 276 to transfer the constant value plus 1 from register 282 to one input of the adder 302 via OR gate 268. The contents of the D register 254 are also transmitted to the adder 302 via cable 255. The sum, a value of 2 (00000010), produced by adder 302 is representative of the third character type on the bar 2 which is now approaching column 6 of the record 8. This value is transmitted via cable 305 and gate 286, also alerted by the 15 function signal back to the control register 204 via cable 287. At the trailing edge of the write pulse, counter 146 is again stepped in the same manner previously described. However, an examination of FIGURE 5 reveals that the differentiated output from the first stage flip-flop 160 of counter 146 is now transmitted through AND gate 178 to the set input of 164 to produce the C2 count signal, and the count of C1 is skipped. AND gate 178 is alerted by the $\overline{SS}$ signal which is produced by flip-flop 116 after the first cycle of operation of counter 146.

During the count of C2 when the read signal is present, only AND gate 337 (FIG. 7) produces a function signal, namely the 23 function signal. Gate 337 is rendered operative by the read signal, the $\overline{SS}$ signal and the C2 count signal. None of the remaining AND gates controlled by the C2 count signal and the read signal receive all the inputs necessary to render that gate operative. The 23 function signal is applied to AND gate 248 (FIG. 6a) which transmits the value stored in the print buffer address register 208 to the D register 254 via OR gate 252. The value presently in register 208 is a 4. This value is used to ultimately address the memory 200 so that the character for the second even location (column 4) in the memory 200 can be compared with a character type approaching the second even column (i.e. column 4) of the record 8. The write pulse that follows on a count of C2, as previously described, causes the generation of the 24 and 25 function signals. As noted above the 25 function signal renders gate 250 (FIG. 6a) operative so that the value in the print buffer address register 208 may be transmitted from the D register 254 via cable 257 into the memory address register 202. Memory address register 202 will not only address the memory at location 4 but will also produce the MAR4 signal.

The trailing edge of the write pulse steps the counter 146 from a count of C2 to a count of C3. The read signal available at a count of C3 causes AND gate 341 to produce the 27 function signal which renders AND gate 306 operative so that the contents of the memory location (i.e. location 4) designated by the value stored in register 202 can be transmitted through OR gate 252 into the D register 254. At this time the D register 254 stores the character for the fourth column of the record 8 and the B register 258 stores a representation of the character type approaching that column of the record. The write pulse from binary counter 150 during the count of C3 causes AND gate 342 (FIG. 7) to produce the 28 function signal. As before the 28 function signal causes the complemented value in the B register 258 to be transferred to one input of the adder 302. The other input to adder 302 is derived from the D register 254. Again the value in the B register 258 is subtracted from the value of the D register 254. If comparison is obtained a pulse is produced on line 307 which is transmitted via AND gate 292 to all of the AND gates 296–1 to 296–64. Only the second of these gates namely 296–2 (not shown) will transmit a pulse since this gate would be alerted by the MAR4 signal. The output of this gate 296–2 would set a flip-flop 298–2 (not shown) associated with the print hammer of FIGURE 2 for the third and fourth columns of the record.

The cycling of counter 146 continues in this manner until the contents of every even location in memory 200 is compared in order with all the character types in the font on bar 2. The last even location in the memory 200 to be addressed is location 128. When this occurs the MAR128 signal is produced by register 202 (FIG. 6a) and is applied via OR gate 110 (FIG. 4) to reset the scan flip-flop 112. When reset, flip-flop 112 removes the scan signal from AND gate 142 to thereby prevent further write pulses from stepping the cyclic counter 146 via trailing edge detector 144. The MAR signals are produced at a count of C3 from cyclic counter 146 and hence the cyclic counter remains at this output until the scan flip-flop 112 is reset. Again here it may be desirable that the input through OR gate 110 include a differentiator to prevent a steady state signal from keeping the scan flip-flop 112 in its reset condition.

After all the memory locations, i.e. the even location in this case, have been compared with all of the representations of the character types on the bar it is possible that all of the flip-flops 298–1 to 298–64 would be set. This would occur when the complete font is printed in order in alternate even character spaces on the record 8. However, for the purpose of this explanation assume for the moment that as a result of this first scanning of the memory only the flip-flops 298–1 and 298–64 have been set to indicate that the character @ should be printed in column 2 and the character ? should be printed in column 128. After all the 64 cycles of the counter 146 have taken place the print bar 2 moves to the left a distance so that the sprocket S2 (FIG. 3b) is detected by head 34. In response to sprocket S2 head 34 produces the L signal which is applied via amplifier 82, AND gate 100, OR gate 102 to the input of the print fire AND gate 118 (FIG. 4). This gate also receives the print signal from flip-flop 106 and the $\overline{FS}$ signal from flip-flop 90. Both of these signals are present and when OR gate 102 transmits a signal to AND gate 118 the fire pulse is generated. The fire pulse is applied to the reset inputs of all of the flip-flops 298–1 to 298–64 of FIGURE 6. Those that have been previously set will be reset and will produce a pulse at this time which is applied by differentiators 300–1 to 300–64 to the windings of individual ones of the print hammers on FIGURE 2. In the example given above the hammer covering column spaces 1 and 2 will be fired to print the character @ in column 2 and the hammer associated with columns 127 and 128 will be fired to print the character ? in column 128.

The output of AND gate 102 generated in response to the second sprocket S2 causes trailing edge detector 114 to produce a signal that sets flip-flop 116 and is applied to one input of AND gate 108. Flip-flop 116 again produces the SS signal. AND gate 108 again will transmit a signal since the remaining two inputs to this element are present, i.e. the print signal and the run signal. The output of AND gate 108 sets the scan flip-flop 112 which in turn activates AND gate 142. The next write pulse from binary counter 152 is transmitted through gate 142 and is detected by element 144 to cause the cyclic counter 146 to be stepped from a count of C3 to a count of C0. The C0 count signal and the following read pulse alert gates 320 to 324 of FIGURE 7. Of these AND gates only gates 321 and 324 have signals applied to all their inputs and produce the function signals 11 and 14. Function signal 11 is applied to AND gate 246 via OR gate 210. AND gate 246 enables the contents of the start code register 206 to be transmitted via the OR gate 252 to the D register 254. It will be recalled that the start code register 206 stores the character representation for the second letter (A) in the font which is now approaching the second column of the record 8 (see FIG. 3b). The 14 function signal allows the same value to be transferred via gates 256 into the B register 258 while remaining in the D register 254. The next write pulse from binary counter 150 during a count of C0 causes AND gate 325 to produce the 15 function signal which alerts AND gate 274 (FIG. 6b) via OR gate 276. AND gate 274, as previously described, transfers the constant "plus 1" from register 282 to the input of the adder 302 via OR gate 268. The other input to the adder 302 is applied from the D register 254 via cable 255. The contents of the D register 254 are increased by one by the adder 302 and the sum is available on line 305. The sum output of 00000010 is representative of the third character in the font. This sum output is transmitted from the adder 302 via gate 286, also alerted by the 15 function signal, and cable 287 back to the control register 204.

The trailing edge of the write pulse steps the counter 146 to a count of C1.

It will be recalled that the flip-flop 116 (FIG. 4) has been again set by the output of trailing edge detector 114 produced in response to the second sprocket S2 and again flip-flop 116 produces the SS signal. The SS signal is applied to AND gate 180 of the cyclic counter 146 (FIG. 5) so that when the first stage flip-flop 160 is reset a signal is transmitted through gate 180 to the second stage flip-flop 162 which produces the C1 signal.

The control matrix of FIGURE 7 at a count of C1 operates to produce the same function signals previously generated on this count after the detection of this first sprocket S1. Accordingly, at the end of this step the start code register 206 stores a representation of the character type which will be approaching the second column of the record when the third sprocket S3 is detected. The operation of the printing device for the C2 and C3 counts for the first cycle of counter 146 after sprocket S2 is detected is the same as previously described. After the first cycle of operation, for the second sprocket S2, the cyclic counter 146 produces counts C0, C2 and C3 sixty-three times so that all the characters in even location in memory 200 are compared with the representations of the character types on the print bar 2. When sprocket S3 is detected the print hammers (FIG. 2) are selectively fired and a new memory scan takes place. This operation continues until the 64th sprocket S64 (FIG. 3) is detected by head 34. When this occurs the character types > and ? (from the first font) will be opposite columns 2 and 4 of the record 8 and the character types @, A etc. from the second font will be opposite the remaining even columns of the record 8. The detection of the sixty-fourth sprocket S64 indicates that the last memory scan of the even locations in the memory is to take place since the print bar 2 has almost completed its leftward motion. It will be appreciated that during the C1 step (first cycle of counter 146 after a sprocket is detected) the value in the start code register 206 (FIG. 6*a*) is increased by 1 and represents the code of the character type which is two characters away from the sprocket just detected and which is approaching column 2 of the record 8. Thus during the C1 step following the detection of the 63rd sprocket S63 the value 00111111 representative of the character type ? in the font is stored in the start code register 206. In the C0 step as explained above the contents of the start code register 206 are transferred to the D register 254 and the B register 258 (FIG. 6*a*). In particular, in the C0 step immediately following the detection of the sprocket S64, when the bar is moving left, the representations 00111111 of the last character type "?" is transferred into the B register 258. This indicates that the print bar is nearly at the end of its leftward motion and only one more memory scan operation is needed. The B decoder 262 (FIG. 6*a*) is coupled to the B register 258 and produces the LC signal when the representation of the last character ? in the font is stored in the B register 258. The LC signal is applied to AND gate 95 (FIG. 4) along with the C1 count signal and the BL signal from the bar direction flip-flop 92 (FIG. 4). Accordingly, when the cyclic counter 146 steps to a count of C1, AND gate 95 transmits a pulse through OR gate 97 to reset the run flip-flop 91 which in turn produces the $\overline{\text{run}}$ signal. The $\overline{\text{run}}$ signal is applied to AND gate 120 and the run signal from flip-flop 91 is removed from AND gate 108.

When the 65th sprocket S65 is detected a pulse again is transmitted through amplifier 82, AND gate 100, OR gate 102 to the trailing edge detector 114 and to fire AND gate 118 (FIG. 4). The output of trailing edge detector 114 now is transmitted through AND gate 120 to the set input of flip-flop 122 via OR gate 121. The output of AND gate 120 is also applied to one input of AND gate 140 which receives the set output of flip-flop 122 through delay element 126. The delay element 126 is chosen to impede the set output signal derived from flip-flop 122 for a time equal or greater than the pulse width of the signal from AND gate 120. Accordingly, AND gate 140 does not transmit a signal at this time. However, the set output of flip-flop 122 applied through delay element 126 alerts AND gate 140 and the next pulse through AND gate 120 will be transmitted as an end signal. As shall be shown AND gate 120 will transmit a pulse after the print bar has completed its motion in the opposite direction, i.e. in this case has completed its rightward motion.

The output of OR gate 102 transmitted to AND gate 118 causes the fire pulse to be generated which is applied to the reset inputs of flip-flop 298–1 through 298–4 (FIG. 6*b*). The fire pulse produced in response to the 65th sprocket S65 caused all the characters to be printed in even column locations of the record 8 which should be printed as a result of the comparisons which took place after sprocket S64.

However, the pulse produced from trailing edge detector 114 in response to sprocket S65 is not transmitted through AND gate 108 to set the scan flip-flop 112 because the run signal from flip-flip 91 is no longer present to alert gate 108. Thus, the memory 200 is not scanned in response to sprocket S65.

After the print bar has completed its motion in the left direction all the characters have been printed in the even locations of the record 8.

To complete the printing operation the characters for the odd columns of the record 8 must be printed, and this is accomplished as the print bar 2 moves right. The description relating to the printing of characters in the odd columns will not be presented in detail, since this operation is similar to the printing of characters in the even columns of the record. Only the differences in operation will be treated.

After the print bar turns around, the TA signal from resettable delay flop 96 (FIG. 4) alerts AND gate 86 which transmits the first sprocket (S65) detected by head 35 (FIG. 3*c*) to the set input of the bar direction flip-flop 92. This flip-flop in turn produces the bar right (BR) signal which is applied to AND gate 98. As previously explained when the print bar 2 is moving right only sprockets detected by head 35 and transmitted by amplifier 80 will reach the trailing edge detector 114 via the path comprising AND gate 98 and OR gate 102. The pulses produced at the output of OR gate 102 control the fire AND gate 118 and the trailing edge detector 114 as previously described in connection with the leftward movement of the print bar. Further, the output of the trailing edge detector 114 controls flip-flop 116, AND gate 120 and AND gate 108 in the same manner previously described. All those flip-flops and gates actuated by the turn-around signal (TA) in connection with the description of printing when the print bar was moving left are again actuated when the print bar 2 is moving right. All of the apparatus on FIGURE 4 operates as previously described except that (1) the path comprising amplifier 80, AND gate 98 and OR gate 102 is used to transmit sprocket pulses instead of the path comprising amplifier 82, AND gate 100 and OR gate 102; (2) AND gate 93 which receives the bar right signal will be used to reset the run flip-flop 91 via OR gate 97 instead of AND gate 95 which receives the bar left signal; and (3) the scan flip-flop 112 is reset by a MAR127 signal via OR gate 110 instead of the MAR128 signal. The MAR127 signal is used because address 127 in memory 200 is the last odd location utilized in every memory scan when the print bar 2 is moving right.

A difference in operation occurs when the first C0 count is produced by counter 146 immediately after the TA signal is generated. When the print bar 2 was moving left at this time AND gate 322 (FIG. 7) was activated to produce the 12 function signal. This signal, it will be recalled, caused AND gate 236 (FIG. 6*a*) to transmit the code from register 218 representative of the first character in the font into the D register 254. However, when the print bar 2 is moving right it is necessary to transfer the code representative of the last character type ? in the font to the D register 254 because this character type is approaching column 1 of the record 8. For this reason the 13 function signal is generated by AND gate 323 (FIG. 7) which is applied via OR gate 230 to one input of AND gate 242 (FIG. 6*a*). In response to the 13 function signal AND gate 242 transmits the value 00111111 stored in register 220 representative of the last character type (?) in the font into the D register 254 via OR gate 252. This code representation is transmitted to the B register 258 and to the adder 302 where a one is added to it before this representation is transmitted to the control register 204 via AND gate 286 and cable 204. The value in the B register 258 at this time is representative of the last character in the font and that character is approaching column 1 of the record (see FIGS. 3*c* and 3*d*). The value in the control register 204 will be all zeros $$(111111+1=000000)$$

and this code representation is representative of the character @ which is approaching column 3 of the record 8. It will be noted that AND gate 286 does not transmit the two most significant digits of the sum produced by adder 302 to the register 206. As before the contents of the control register 204 will be increased by 1 each time the memory 200 is addressed at a new location.

The second difference in operation takes place during the C1 count immediately after the TA signal is generated. When the print bar was moving left, at this time, AND gate 329 was operated to produce the 19 function signal. The 19 function signal again caused AND gate 236 to transmit zeros from register 218 into the D register 254 via OR gate 252. However, when the print bar 2 is moving right the 19 function signal is not generated and the 20 function signal is generated by AND gate 330 (FIG. 7) in its place. The 20 function signal causes AND gate 242 to transmit the code representation for the last character in the font from register 220 to the D register 254 via OR gate 252.

As before during the C1 step the contents of the D register 254 are transmitted to the adder 302 to be modified and then deposited into the start code register 206. In the previous case when the bar was moving left this modification was accomplished by the function signal 21 produced by AND gate 330 of matrix 7. However, this gate is not selected since it requires a bar left signal. AND gate 332 (FIG. 7) which receives the bar right signal and the C1 count signal as well as the write pulse is selected to produce the 34 function signal via AND gate 346. The 34 function signal causes AND gate 272 (FIG. 6*b*) to transmit the contents of register 280 to one input of the adder 302. The other input of the adder 302 at this time will come from the D register 254 which is storing a representation of the character font on the print bar which will next be printed in column 1 of the record. The value in register 280 is a minus 1 and therefore the output of the adder 302 on cable 305 is representative of the character type which precedes the character ?. This code representation is transmitted as before during the C1 step to the start code register 206. It will be appreciated that the start code register 206 is used to store character representations of character types which are either approaching column 2 or column 1 of the record 8 depending upon whether the print bar 2 is going left or right. When the bar is going left the character types approaching column 2 of the record are represented by codes which increase in value. The opposite is true when the print bar 2 is going right and character types which approach column 1 of the record are represented by codes which decrease in value. When the print bar 2 is moving right the code representation to be stored in the start code register 206 must be decreased by 1 for every count C1 which is produced by the cyclic counter 146.

Finally another difference in operation is to be noted and this takes place during the first C2 count by cyclic counter 146 after each sprocket is detected (i.e. when the SS signal is present). When the print bar 2 was moving left the 33 function signal was generated which caused the base address plus 1 (a value of 2) to be transferred from register 216 through AND gate 238, and OR gate 252 into the D register 254 from whence it was transferred via AND gate 250 into the memory address register 202. The value in the register 296 designates the first even location in the memory 200. It will be recalled that this address was increased by 2 during each cycle of counter 146 so that when the print bar 2 was moving left only even addresses were used to access the memory 200. However, when the print bar 2 is moving right AND gate 335 in the matrix of FIGURE 7 is made operative by the BR signal, the SS signal, and the read signal to produce the 32 function signal via AND gate 347. The 32 function signal is applied via OR gate 310 to render AND gate 240 (FIG. 6*a*) operative to transfer the base address (a value of 1) from register 214 via OR gate 252 into the D register 254. As before this value is transmitted into the memory address register 202 via AND gate 250. Thus, when the print bar 2 is moving right the first location to be addressed is memory location 1 and the additional locations during each scan will be odd since the base address is constantly increased by a value of 2.

Other than noted above the printing of characters in odd columns of the record 8 is substantially the same as printing characters in the even locations.

When the print bar 2 has almost completed its rightward motion preparations must be made to end the printing operation. To this end it will be appreciated that when the representation for the character @) is stored in the D register 258 the last memory scan is at hand. At this time the character type @ is approaching column 1 of the record, character type A is approaching column 3 of the record and the type B etc. (all of the first font) are approaching the remaining odd columns of the record. This will occur when sprocket S2 is detected by head 35.

During the first cycle of operation after sprocket S2 is detected the code (00000000) for the first character type, @, in the font will be in the B register 258 and accordingly the B decoder 262 (FIG. 6*a*) generates the first character (FS) signal. When the C1 count is produced by counter 146 during this first cycle after the sprocket S2 is detected, AND gate 93 (FIG. 4) will transmit a signal to reset the run flip-flop 91 via OR gate 97. Accordingly, the run signal is removed from AND gate 108 and the $\overline{\text{run}}$ signal is applied to AND gate 120.

When the last sprocket S1 is detected as the print bar 2 moves right the print operation is terminated. In particular, when sprocket S1 is detected a signal is transmitted via amplifier 80 (FIG. 4), AND gate 98 and OR gate 102 to the input of fire AND gate 118 and to the input of the detector 114. This last sprocket causes AND gate 118 to produce the fire pulse which is applied to flip-flops 298–1 to 298–64 (FIG. 6*b*). These flip-flops, as before, cause all the characters to be printed in columns of the record 8 where comparison was obtained after reading out (scanning) the characters in the memory 200 and comparing them with the character types on print bar 2 approaching corresponding columns of the record 8.

The output of OR gate 102 is not transmitted via AND gate 108 to again set the scan flip-flop 108, and thus the memory 102 is not scanned after the sprocket S1 is detected when the print bar is moving right. AND gate 108 is not operative because the run signal has been removed from its input.

Finally the output of trailing edge detector 114 is transmitted via AND gate 120 because the $\overline{\text{run}}$ signal and the print signal are present. The output of AND gate 120 is applied to end gate 140 which is alerted by the set output of end flip-flop 122. End flip-flop 122 was set previously when the print bar 2 finished its first movement (i.e. completed its leftward motion) across the record 8. AND gate 140 produces the end signal which resets the print flip-flop 106. Therefore the set output of this flip-flop is removed from AND gate 108 which controls signals to again set the scan flip-flop 112. Accordingly, Gate 108 will not thereafter transmit additional sprocket signals to again set the scan flip-flop 112. Accordingly, the cyclic counter 146 will not be stepped until a new print operation is commenced, that is, until a new instruction is transmitted from the computer.

It will be understood that the printing operation could have started as the print bar 2 was moving right. In this case the print operation terminates after the print bar 2 completes its leftward swing.

In the second mode of operation the offset bar 2A shown in FIGURE 9 is employed with the apparatus of FIGURES 1 and 2.

When the offset bar 2A is employed the flow of information between the various elements of FIGURE 6 is controlled by the function signals emanating from the matrix of FIGURE 8 as well as the matrix of FIGURE 7.

The apparatus responsive to sprockets on FIGURE 4 including counter 146 operates substantially as previously described. Only one additional signal is employed in connection with FIGURE 4 and that is the MAR129 signal applied via OR gate 110 to reset the scan flip-flop 112. The use of the MAR129 signal shall be explained below.

In the second mode of operation only the character types in the first portion of the fonts are used. That is, only character types of the first font as shown in FIGURE 9 which are opposite even columns of the record 8 and their corresponding character types in the second font are used for printing in the second mode of operation, i.e. where a limited set of alpha-numeric characters are printed. In this mode of operation characters are printed (using the first portions of both fonts) in even columns of the record 8 as the print bar 2A moves left and characters are printed in odd columns as the print bar 2A moves right.

In general the printing operation for the second mode is similar to that already described and only the differences between the first and second printing modes will be discussed in detail. All of the signals generated by the control matrix of FIGURE 8 will be discussed. In describing the printing operation it will be assumed that printing is commenced as the print bar 2A moves left and that the first sprocket S1 has already been detected. That is, the bar 2A is as shown in FIGURE 9 with respect to the record 8.

When the offset bar 2A is used switch 405 (FIG. 8) is closed and contacts terminal 405*a*. Switch 405 applies the 48/16 signal to the matrix of FIGURE 1 and alerts all of the AND gates 40 to 50 on FIGURE 8.

In the second mode of operation an instruction indicating that alpha-numeric characters should be printed is applied by the computer or other external source (not shown) to reset flip-flop 404. The reset output of flip-flop 404 produces the $\overline{\text{NUM}}$ signal which is applied to gate 41.

The first signal generated by the matrix of FIGURE 8 to be discussed is the translate signal (T). The translate signal is applied to alert gate 304 (FIG. 6*a*) and to inhibit AND gate 306. The T signal is produced by gate 40 (FIG. 8) in response to the 48/16 signal and to the C3 count signal from cyclic counter 146 (FIG. 4). It will be recalled that 27 function signal (see gate 341, FIG. 7) alerts AND gates 304 and 306 (FIG. 6*a*) each time the C3 count signal is produced. At this time the contents of a selected location in memory 200 is transmitted via AND gate 306 or 304 and the translator 212 to the D register 254 for comparison with the contents of the B register 258. The B register 258 stores representations of character types on the print bar 2A. These representations are formed, as previously explained, so that the first character type in the 64 character font is represented by a binary value having all zero bits (i.e. zero) and the last character in the font is represented by a binary value having all one bits (i.e. 63). From the previous description of the fonts and by comparing FIGURES 3 and 9 it can be seen that the character types on the first or standard bar (FIG. 3) are not all the same as the character types on the offset bar (FIG. 9), and those that are the same may be in different positions on the print bars. Thus, for example, when the first print bar 2 (FIG. 3) is used, the B register 258 will store a value equal to one in binary form when the character type A (second character in the font on the first print bar 2) is compared with the contents of a location in memory 200. When the second offset print bar 2A is used the B register 258 will store a value equal to zero in binary form when the character type A (first character in the font on offset bar 2A) is being compared with the contents of a location in the memory 200. The memory 200 stores character representations in the same code notwithstanding which print bar is used. The code chosen for the storage of characters in memory 200, in this specific embodiment, is the same as the code for the character types on the first print bar 2, so that the representation of the character A in the memory is the binary equivalent of zero. To make the code representations in the memory 200 compatible with the code representations of the character types on the second bar 2A, the translator 212 is employed. The translator 212 may comprise a gating array which detects the characters from the memory in the aforementinoed code and converts that representation into a code compatible with the representations of the character types from the offset print bar 2A. For example, one of the AND gates in the matrix comprising the translator 212 detects the combination of binary bits representing the letter A in the memory 200 and converts it into a combintion of bits representative of the character type A on the print bar 2A. Other gates in the translator 212 perform similar functions for other characters in the memory 200 which are to be printed by the offset print bar 2A.

The next signal to be discussed is the output produced by AND gate 41. AND gate 41 produces a signal which inhibits AND gate 292 (FIG. 6*b*) in response to the output of switch 405; the C3 count signal from cyclic counter 146 (FIG. 4); the $\overline{\text{NUM}}$ signal from flip-flop 404; and the OSN signal from the B decoder 262 (FIGS. 6*a* and 10). It will be recalled that AND gate 405 (FIG. 10) of the B decoder 262 produces the OSN (offset numeric) signal for each of the sixteen codes having the values from 010000 to 011111 and that these codes are representative of the 16 character types in the offset portion of the print bar 2A. Obviously as the counter 146 cycles these code representations will be generated and stored in the B register 262. Further, it will be recalled when the C3 count signal and the write pulse (from binary counter 150, FIG. 4) are present that AND gate 342 (FIG. 7) produces the 28 function signal. The 28 function signal allows the contents of the B register 258 (FIG. 6*a*) storing a representation of the character types to be transmitted via gates 264–1 to 264–8 (FIG. 6*b*) to the adder 302 at the same time the contents of the D register 254 transfer a character representation from a selected location to the adder 302. If the result from the adder 302 shows that the contents of the B register 258 and D register 254 are the same, an output is produced on line 307 (FIG. 6*b*). This output is transmitted via AND gate 292 to the set input of one of the flip-flops 298–1 to 298–64. These flip-flops 298–1 etc. cause the print hammers of FIGURE 2 to be actuated. However, in this mode of operation character types from the offset portion are not used. To this end the output of AND gate 41 (FIG. 8) inhibits AND gate 292 (FIG. 6*b*) each time one of the aforementioned code representations of an offset type is stored in B register 258 and is being compared with the contents of the D register 254 (FIG. 6*a*).

AND gate 42 is controlled by the NUM signal from flip-flop 404 which is not present in this mode of operation and hence this AND gate will not be discussed at this time.

AND gate 43 produces the 128 function signal in response to the output of switch 405 to C3 count, the OSN signal and NUM signal from flip-flop 404. Again, since the NUM signal is not present this AND gate and the signal produced thereby will not be discussed at this time.

The signals from the matrix of FIGURE 8 next to be considered are the 121 and 134 function signals produced at the outputs of AND gates 46*a* and 49*a*. AND gate 46*a* is operated in response to an output from gate 46 and the 21A signal from AND gate 331 (FIG. 7) whereas AND gate 49*a* is operated in response to an output from gate 49 and the 34A signal from AND gate 32 (FIG. 7). Outputs from AND gates 46 and 49 are used to inhibit AND gates 345 and 346 and prevent the generation of the 21 and 34 function signals (FIG. 7). The 21A signal (FIG. 7) is produced when the C1 count signal is present; the print bar is moving left, i.e. the BL signal is present; and the write pulse is generated. AND gate 46 (FIG. 8) produces an output in response to $\overline{FF1}$ signal from flip-flop 403; the output of switch 405 and the ZOSN signal from the B decoder 262. The $\overline{FF1}$ signal is produced by flip-flop 403 when the print bar (FIG. 9) changes direction, i.e. the TA signal resets flip-flop 403. The ZOSN signal is produced whenever the value 010000 representative of the character type zero (ϕ) in the offset portion of the fonts of the print bar 2A is in the B register 258. The 21A signal, which conditions AND gate 46*a*, indicates that the print bar 2A is moving left and that a sprocket on the bar 2A has just been detected. This is true since the C1 count signal necessary to produce the 21A signal indicates that the counter 146 is going through its first cycle after the detection of a sprocket. An output from gate 46, which also conditions AND gate 46*a*, indicates that the offset bar 2A is being used and that the representation of the zero character type from the offset portion of the font is in the B register 258. The generation of the 121 function signal by AND gate 46*a* indicates all the above conditions are present. In order for the above conditions to exist the character type P in the first font and sprocket S17 must be opposite column 2 of the record and head 34 and the representation of the next character in the font, i.e. zero from the offset portion, is stored in the start code register 206. Further the character type ϕ from the offset portion of the first font will be opposite column 5 of the record. At this point in the bar movement of print bar 2A a change of operation takes place. That is, when the next sprocket S18 is detected the character types on the bar 2A nearest the left edge of the record 8 will line up with an odd column, i.e. column 3, instead of an even column, i.e. column 2. In particular, character types ϕ through - (from the offset portion of the first font) will be lined up with columns 3, 5 etc. to column 27 and the character types from the first portion of the first and second fonts will be lined up with the rest of the even columns of the record 8. Further, no character types are lined up with either column 1 or column 2 of the record 8 at this time.

As indicated above the output of AND gate 46 (FIG. 8) prevents the 21 function signal (FIG. 7) from being generated at a C1 count when the representation for the offset zero type is in the B register 258. From the explanation previously given it will be understood that during the C1 count, the code representation from the start code register 206 representative of the character type approaching column 2 of the record is transferred to the D register 254 and then transfered to the adder 302 where a 1 is added to this representation before it is returned to the start code register 206. This addition operation takes place in response to the 21 function signal acting upon AND gate 274 which transmits the contents of register 282 (storing a plus 1) to the adder 302. The value just computed and stored in the start code register 206 represents the character to be next printed in either column 1 or column 2 of the record 8 depending upon the direction of the bar movement. This operation just described cannot take place at this time because the 21 function signal is not generated. Instead the 121 function signal is generated. This signal merely alerts AND gate 288 (FIG. 6*b*) via OR gate 290 so that the contents of the D register 254 storing the value representative of the character type ϕ in the offset font are transmitted unchanged via the adder 302. AND gate 288 and cable 289 back into the start code register 206. The 121 function signal as just explained is generated when the representation of the character type ϕ from the offset font is in the B register 258 and the bar 2A is in the position indicated above. Accordingly, at this time the representation of the ϕ character from the offset portion of the font is transmitted from the start code register 206 through the D register 254 and the adder 302 back thereto unchanged.

As the print bar 2A continues to move left the sprocket S18 will be detected by the read head 34. When sprocket S18 is detected the character ϕ in the offset portion of the font will be approaching column 1 of the record and the rest of the characters from this portion of the font will be approaching columns 3 through 33 of the record 8. The alphabetic characters from the first portion of the font beginning with the character type Q will be approaching even columns 36, 38 etc.

As is explained below the generation of all of the character types on the bar 2A begins twice with the representation of the letter ϕ from the offset portion of the font. This occurs when the letter ϕ from the offset portion of the font on bar 2A is approaching column 3 of the record 8 and again when this letter approaches column 1 of the record 8. A sprocket detected (sprocket S17) when the character type ϕ from the offset portion of the font is approaching column 3 must not cause the value in the start code register 206 to be changed. However, before the sprocket S18 is detected, i.e. when the ϕ character type is approaching column 1, the flip-flop 403 must be set so that this character representation may be changed and represent the character type 1 which will be the next character type to approach column 1 of the record. To this end AND gate 400 transmits a signal through OR gate 402 to set flip-flop 403 and thereby remove the $\overline{FF1}$ signal from AND gate 46. In particular, AND gate 400 is operated by the ZOSN signal, the BL signal from flip-flop 92, the SS signal from flip-flop 116 and the C3 count signal. It will be recalled that the 121 function signal was produced in response to the ZOSN signal and a C1 count signal when the representation of the letter ϕ is stored in the B register 258 and detected by the decoder 262. This same ZOSN signal is transmitted via AND gate 400 (FIG. 8) when the counter 146 reaches a count of C3.

The 136 function signal produced by AND gate 49*a* (FIG. 8) serves a purpose similar to that of the 121 function signal. The 134 function signal is applied to AND gate 288 via OR gate 290 (FIG. 6*b*) as was the 121 function signal. Gate 49 (FIG. 8) controls AND gate 346 (FIG. 7) and receives the $\overline{FF}$ signal, the 48/16 signal and the Q signal from the B decoder 262 (FIG. 6*a*). An output from gate 49 alerts AND gate 49*a* and inhibits AND gate 346 and prevents the generation of the 34 function signal. The 34A signal, which also controls AND gate 49*a*, is produced during a C2 count from counter 146 when the print bar 2A is moving right. When the print bar 2A is moving right the representation for the character Q must be preserved in the start character register 206 for the same reason as described in connection with the character $\phi$ when the print bar 2A was moving left. At this time the character type Q will be the character that can be printed in column 1 following the memory scan in response to the sprocket S35 and will also be the first character on the bar 2A which will be opposite column 3 of the record after the memory scan caused the detection of sprocket S34. Due to the space between the character types Q and - on the print bar 2A (FIG. 9) no character type will be adjacent column 1 of the record 8 when the character type Q can be printed in column 3 of the record 8. Since the character type Q (when the print bar 2A is moving right) is the character that can be printed in leftmost columns of the record 8 twice (i.e. once in column 1 and once in column 3) the representation thereof must be used twice (from register 206) in determining the place in the code from which to start generating all the codes for character types used during the scans of the memory following the detection of sprockets S35 and S34.

The next function signals to be considered are the 133 and 132 function signals which are produced by AND gates 45*a* and 48*a* respectively. Function signal 133 is used when the print bar 2A is moving left and function signal 132 is used when the print bar 2A is moving right. AND gate 45*a* receives the 33A signal from gate 336 (FIG. 7) and the output of AND gate 45. Gate 45 produces an output in response to the $\overline{FF1}$ signal, the 48/16 signal and the ZOSN signal. This output alerts AND gate 45*a* and inhibits AND gate 348 to prevent the generation of the 33 function signal (FIG. 7). The 33A signal is generated by gate 336 (FIG. 7) in response to the read pulse; the SS signal; the BL signal; and the C2 count signal. The 133 function signal is therefore produced immediately after the 121 function signal discussed above and in the first cycle at a count of C2 after the sprocket, i.e. S17, has been detected. In the print operation following the memory scan associated with sprocket S17 the character type $\phi$ (from the offset portion of the font) will be in line with column position 5; the character types 1 through - will be in line with column positions 7 to 35 and the character types Q etc. from the first portion of the font will be in line with the remaining even columns of the record. No character type will be opposite column 1 of the record at this time. Accordingly, the memory scan associated with sprocket S17 must start with memory location 3 storing the character for column 3 of the record 8 instead of memory location 1 or 2. To this end function signal 133 is transmitted via OR gate 312 (FIG. 6*a*) and operates AND gate 226 which transmits the address 3 (i.e. base address+2) into the D register 254 via OR gate 252. Function signal 25 (see FIG. 7) which is generated when the write pulse is produced during a count of C2 operates AND gate 250. AND gate 250 transmits the contents of the D register 254 into the memory address register 202. The scanning of the memory 200 will thus start from memory location 3 when the 133 function signal is produced.

A similar event occurs when the print bar 2A is moving right and the 132 function signal is generated by AND gate 48*a* (FIG. 8). This AND gate is rendered operative by the 32A signal from gate 335 of the matrix shown in FIGURE 7 and the output of gate 48. The 32A signal is generated in a manner similar to the 33A signal just discussed except that it is generated when the print bar 2A is moving right. That is, the 32A signal is generated at a count of C2 during the first cycle of counter 146 following the detection of a sprocket.

Gate 48 produces a signal responsive to the set output of flip-flop 403, the 48/16 signal and the Q signal from the B decoder 262. Flip-flop 403 is set by the output of AND gate 401 which is applied thereto via OR gate 402. AND gate 401 operates during the C3 count immediately after a sprocket is detected when the print bar 2A is moving right and the character Q is detected by the B decoder 262. This will be the first of the two times the code for the character type Q is used to determine the place in the order of characters from which to start producing all the code representations of the character types on the bar 2A. As previously explained, this occurs after sprocket S35 is detected and the character type Q is approaching column 1 of the record 8. At this time, the scan of the memory 200 will start from memory location 1. However, during a C2 count following the detection of the next sprocket, i.e. S34, gate 48 produces an output which is applied to inhibit gate 347 (FIG. 7) preventing the generation of the 32 function signal and is applied to gate 48*a* which produces the 132 function signal. It should be appreciated that the memory scan in response to sprocket S34 should begin at memory location 3 instead of memory location 1 (i.e. the base address). This is because no character types will be approaching column 1 of the record 8 and the character type Q will be approaching column 3. To this end the 132 function signal is generated and applied via OR gate 312 to operate AND gate 226. And gate 226 as before transfers address 3 from register 222 via OR gate 252 into the D register 254. After this address is transferred to the D register 254 it is applied to the memory address register 202 via gate 250. The scanning of the memory 200 will thus start from memory location 3 when the 132 function signal is produced.

The next function signals to be considered are the 233 and 232 function signals which are produced by AND gates 47*a* and 50*a*, respectively. Function signal 233 is used when the print bar 2A is moving left and function signal 232 is used when the print bar 2A is moving right. AND gate 47*a* receives the 33A signal (FIG. 7) and the output of AND gate 47. AND gate 47 produces an output in response to the OSN signal from the B decoder 262 (FIGS. 6*a* and 10) and the 48/16 signal. The OSN signal is produced by AND gate 405 (FIG. 10) whenever any of the sixteen codes representative of a character type in the offset portions of the font on print bar 2A is in the B register 258. The output from gate 47 not only alerts AND gate 47*a* but also inhibits AND gate 348 (FIG. 7) to prevent the generation of the 33 function signal. As explained before the 33A signal is generated by gate 336 (FIG. 7) when the C2 count is present in the cycle of counter 146 immediately after a sprocket on the print bar 2A is detected as it is moving left. Therefore, gate 47*a* produces the 233 function signal at a count of C2 just after a sprocket is detected by read head 34 (FIG. 9) and a representation of one of the offset character types is in the B register 258. This occurs when any of the offset character types are approaching column 1 of the record 8. Normally, when the bar 2A is moving left and one of the character types from the first portion of the font is approaching column 2 of the record the scanning of the memory 200 starts in the first even location. That is, the 33 function signal is generated and causes the contents of register 216 (FIG. 6*a*), storing address 2 to be transmitted via AND gate 238 and OR gate 252 into the D register 254 for later transfer into the memory address register 202 via AND gate 250. However, with the character type from the offset font approaching column 1 of the record 8, as the print bar 2A moves left, the scanning of the memory 200 must start from the first odd location (i.e. location 1 in the memory 200. To this end AND gate 47 generates a signal which inhibits gate 348 (FIG. 7) from producing the 33 function signal and together with 33A signal causes AND gate 47*a* (FIG. 8) to produce the 233 function signal when the C2 count is produced by counter 146 (FIG. 4). The 233 function signal is transmitted through OR gate 310 (FIG. 6*a*) and operates AND gate 340 which transmits the contents of register 214 storing address 1 in binary form to the D register 254 via OR gate 252. This address is transferred to the memory address register 250 in a manner previously discussed. Thus, the scanning of the memory will start from memory location 2 when the print bar 2 is moving left and the 233 function signal is generated in response to the condition just described.

A similar situation occurs when the print bar 2A is moving right and the 232 function signal is generated by AND gate 50*a* (FIG. 8). AND gate 50*a* is alerted by the 32A signal from gate 335 of the matrix shown in FIGURE 7 and the output of gate 50. The 32A signal is generated in a manner similar to the 33A signal just discussed, except that it is generated when the print bar 2A is moving right. AND gate 50 produces an output in response to the OSN signal from B decoder 262 (FIGS. 6*a* and 10) and the 48/16 signal. As mentioned in connection with the AND gate 47, the OSN signal is produced by AND gate 405 (FIG. 10) whenever any of the sixteen codes representative of a character type in the offset portion of the font is in B register 258. The output from gate 50 not only alerts AND gate 50*a* but also inhibits AND gate 347 (FIG. 7) to prevent the generation of the 32 function signal. As explained, the 32A signal is generated by gate 335 (FIG. 7) on a count of C2, in the cycle of counter 146 immediately after the sprocket on the print bar 2A is detected as the print bar 2A moves right. Therefore, gate 50*a* produces a 232 function signal at a count of C2 just after a sprocket is detected by read head 35 (FIG. 9) and a representation of one of the offest character types is in the B register 258. This occurs, as the bar 2A is moving right whenever the offset character types are approaching column 2 of the record 8. When the print bar 2A is moving right and one of the character types on the first portion of the tion of one of the offset character types is in the B regis- font is approaching column 1 of the record 8 the scanning of the memory 200 starts from the first odd location (i.e. location 1 in the memory) in the memory 200. That is the 32 function signal is generated and causes the contents of register 214 to be transmitted via AND gate 240 and OR gate 252 into the D register 254 for later transfer into the memory address register 202 via AND gate 250. However, with a character type from the offset portion of the font approaching column 2 of the record, as the print bar 2A moves right, the scanning of the memory must start from the first even location (i.e. location 2) in the memory 200. To this end AND gate 50 generates a signal which prevents AND gate 347 (FIG. 7) from producing the 32 function signal and together with the 32A signal causes AND gate 50*a* to produce the 232 function signal at the count of C2. The 232 function signal is transmitted through OR gate 217 (FIG. 6*a*) and operates AND gate 238 which transmits the contents of register 216 storing the address location 2 to the D register 254 via OR gate 252. This address is transferred to the memory address register 202 via AND gate 250. Thus, the scanning of the memory 200 will start from memory location 2, when the print bar 2A is moving right and the 232 function signal is generated in response to the condition just described.

Finally the last function signal to be considered in this mode of operation is the 124 function signal generated by AND gate 44*a*. AND gate 44*a* receives the 24A signal from gate 338 (FIG. 7) and the output of gate 44. The output of AND gate 44 also inhibits AND gate 349 (FIG. 7) to prevent the generation of the 24 function signal.

Gate 338 (FIG. 7) as previously explained in connection with the first mode of operation produces the 24A signal during every cycle of counter 146 at the count of C2 when the write pulse is present. Gate 44 produces an output in response to the 48/16 signal and the P- output signal from decoder 262 (FIGS. 6*a* and 10). The P- output signal from the B decoder 262 is generated whenever the representation of the character type P from the first portion of the font or the symbol - from the offset portion of the font is in the B register 258.

From the explanation previously given it will be understood that when counter 146 (FIG. 4) produces the C2 count the address in the print buffer address register 208 is transferred to the D register 254. From there this address is transferred both to the memory address register 202 and to the adder 302 (FIG. 6*b*). The transferred contents of the print buffer address register 208 in the memory address register 202 are used to address a location in the memory 200, the contents of which are compared with a representation of a character type on the print bar 2A when the counter 146 is stepped from a count of C2 to a count of C3. The contents of the print buffer address register 208 transferred to adder 302 are normally increased by 2 and transferred back to the print buffer address register 208 for use during the next cycle of counter 146. Function signal 24 causes AND gate 270 (FIG. 6*b*) to transfer a value of 2 from register 278 to the adder 302 for this purpose. However, when the offset bar 2A is used and the P- signal is generated, function signal 24 is not produced and function signal 124 is produced in its place.

Function signal 124 operates AND gate 281 (FIG. 6*b*) which transfers the value 3 to adder 302 at the same time the contents of the print buffer address register 208 are transferred via the D register 254 to the adder 302. The sum produced which is representative of the next address to be accessed in memory 200, will be odd if the address from the register 208 is even and will be even if the address from register 208 is odd.

As the print bar 2A is moving left addressing of the memory 200 for a scan will start at an even address, i.e., location 2, if the character type on the print bar 2A approaching column 2 of the record, after the sprocket is detected by head 34, is from the first portion of the font as shown in FIGURE 9. During the memory scan that takes place after the sprocket is detected, each even location in the memory 200 is examined in order and compared with the representation of the character types on the print bar 2A. Character types proceeding the type $\phi$ and after the character type - (i.e. character types from the first portion of the font) will be lined up with even column positions of the record and character types from the offset portion of the font will be lined up with odd columns of the record 8. The memory addressing during the scan operation after each sprocket is detected follows the relationship of the character types on the print bar 2A to the column positions of the record 8. That is, wherever character types are lined up with even columns of the record, even memory locations storing characters to be printed in those columns will be addressed and wherever character types are lined up with odd columns of the record 8, odd memory locations storing characters to be printed in those columns will be addressed. For example, in the position that the print bar 2A is shown in FIGURE 9, the sprocket S2 is being detected and character types B to P in the first portion of the font are approaching even columns 2 to 30 respectively, offset character types $\phi$ to - are approaching odd column positions 33 to 63 respectively and character types Q to - in the first portion of the font are approaching even column positions 66 to 128 respectively. These character types will be in the positions indicated above when sprocket S3 is detected. In the cycles of counter 146 after sprocket S2 is detected, 64 locations in the memory 200 will be addressed and the contents of these locations will be compared to the representations of the character types on the print bar 2A. One location in memory 200 and one comparison takes place during each such cycle. During the cycles in which the character types B through P are compared with the contents of the memory 200 even locations 2 to 30 will be addressed. During the cycle that the character type P is being compared with the contents of memory location 30 the representation thereof will be in the B register 258 and the B decoder 262 will produce the P- signal. This signal as previously explained prevents a plus 2 from being added to the address of the memory just accessed (e.g. address 30) and causes a plus 3 to be added thereto to form a new address (e.g. 33). This newly formed address is transferred back to the print buffer address register 208 and is used to access the memory during the next cycle when the character $\phi$ from the offset font, approaching column 33 of the record 8, is to be compared with the contents of memory location 33. In the cycle of operation in which the character $\phi$ from the offset font is compared with the contents of a memory location the contents of register 278 storing a plus 2 are used to form a new address. Consequently, during cycles of counter 146 in which any of the representations of the offset character types are being compared (when the bar is moving left) odd locations in the memory 200 will be accessed. In this specific example odd locations 33 to 63 in the memory are used. In the cycle of counter 146 in which the representation of the character type - from the offset portion of the font is in the register 258 the B decoder will again generate the P- signal. This signal, as before, causes the 124 function signal to be generated instead of the 24 function signal and accordingly even locations in the memory will be accessed during the cycles of counter 146 which follows and in which the character types from the remaining portion of the first font are compared with the contents of the even locations in the memory 200.

Function signal 124 will be generated twice for every scan in the memory, notwithstanding, the direction of the movement of the print bar 2A.

If the print bar 2A is moving left and the character type, after (i.e. to the right of) the sprocket detected by head 34, is from the first portion of the font, addressing of the memory 200 will start in the even location and even locations in the memory 200 will be used during the cycles of counter 146 until the representation of the character type P is stored in the B register 258. When this occurs an odd location in the memory (which is three locations above the last address) will be used to address the memory and odd locations will be continued to be used until the character type - in the offset portion of the font is detected. Thereafter even locations will be used to address the memory 200 until the scan operation is completed.

If the print bar 2A is moving left and the character type after (i.e. to the right of) the sprocket detected by head 34 is from the offset portion of the font, addressing will start at an odd location and odd locations in the memory 200 will be used during the following cycles of counter 146, until the representation of the character type P is stored in the B register 258. When this occurs an even location in the memory which is three locations above the last address, will be used to address the memory and even locations will be continued to be used until the character type - from the offset portion of the font is detected. Thereafter odd locations in the memory 200 will be addressed until the scan operation is complete.

If the print bar 2A is moving right and the character type after (i.e. to the left of) the sprocket detected by head 35, is from the first portion of the font, addressing will start at an odd location and odd locations in the memory 200 will be used during the following cycles of counter 146, until the representation of the character type P is stored in the B register 258. When this occurs an even location, which is three locations above the last address used will access the memory, and even locations will be continued to be used until the character type - from the offset portion of the font is detected. Thereafter odd locations in the memory 200 will be accessed until the scan operation is completed.

If the print bar is moving right and the character type, after (i.e. to the left of) the sprocket detected by head 35 is from the offset portion of the font, addressing will start at an even location and even locations in the memory 200 will be used during the following cycles of counter 146 until the representation of the character type P is stored in the B register 258. When this occurs an odd location which is three locations above the last address will be accessed and odd locations will be continued to be used until the character type - from the offset portion of the font is detected. Thereafter even locations in the memory will be accessed until the scan operation is completed.

It will be recalled that a scan operation is ended when the MAR127 or MAR128 signals are produced. These signals are generated when memory locations 127 and 128 are addressed. The MAR signals 127 and 128 are applied via OR gate 110 (FIG. 4) to reset the scan flip-flop 112. When the scan flip-flop 112 is reset AND gate 142 can no longer transmit signals to the cyclic counter 146. Therefore, the scanning operation can no longer continue. It will be observed that the MAR129 signal also is applied to OR gate 110 and when generated will reset scan flip-flop to end the operation of cyclic counter 146. The MAR129 signal is generated. The MAR129 signal will be generated whenever the location used to address the memory during a scan is 126 and the character type P (from the first portion of the font) or the symbol - (from the offset portion of the font) on print bar 2A is approaching column 126 of the record 8. In particular the MAR129 signal will be generated in the cycle of operation following the 1 in which memory location 126 was addressed and the print bar is in one of the positions indicated above. The MAR129 signal also inhibits AND gate 292 (FIG. 6*b*) and prevents the printing operation. The MAR129 signal applied to gate 292 is necessary if the print buffer memory is a part of a large scale memory system storing data for other purposes.

While the second mode of operation has not been described in detail it should be recognized that the print operation is similar to that described in connection with the first mode of operation using the scan print bar 2. The differences are mainly concerned with (1) keeping a count of the first character type representation which is to be generated during the scan of the memory 200; (2) determining the first location in the memory 200 to be addressed; and (3) insuring that the scan of the memory 200 follows the relationship of the character type on the bar 2A with the columns of the record 8.

The function signals 121 and 134 are generated when necessary to control the apparatus of FIGURE 6 to accomplish the operation specified in (1) above; function signals 133, 233, 132 and 232 are generated when necessary to accomplish the operation specified in (2) above; and function signal 124 is generated when necessary to accomplish the operation specified in (3) above.

In the final mode of operation to be discussed the print bar 2A of FIGURE 9 is again used but only the character types in the offset portion of the font and the corresponding characters from the first portion of the fonts are printed. That is, only character types $\phi$ through 9 $ , . / * and - from the offset and first portion of the fonts will be printed. In this mode of operation characters are printed in both the even and odd columns of the record 8 as the print bar 2A moves either left or right. A complete line of the message is printed on the record 8 in one sweep in either direction of the bar 2A across the record 8.

The operation of the printing mechanism in this mode is controlled by the function signals from the matrices of FIGURE 7 and FIGURE 8 in substantially the same manner as previously described. Only the differences in operation will be treated.

To initiate this mode of operation, flip-flop 404 is set by a signal from an external source such as a computer (not shown) in response to an instruction indicating that only the characters specified above, which are essentially numeric, are to be printed. When set flip-flop 404 generates the NUM signal and the $\overline{NUM}$ signal is removed. Only gates 41, 42 and 43 in FIGURE 8 are affected and the signals from these gates will be the only ones to be discussed in detail.

When flip-flop 404 is set gate 41 will no longer receive the $\overline{\text{NUM}}$ signal and will not produce an output. Hence, the inhibition signal selectively produced by gate 41 no longer controls AND gate 292 (FIG. 6b). Instead of the NUM signal produced at the set output of flip-flop 404 alerts AND gate 42 which selectively inhibits AND gate 292. In addition to being controlled by the NUM signal, AND gate 42 also receives the AA (any alphabetic) output signal from B decoder 262 (see FIGS. 6a and 10). OR gate 411 (FIG. 10) of B decoder 262, as previously indicated, produces the AA output whenever the codes for the character types A through P; Q through Z, % @ # & □ and ≠ from the first or alpha-numeric portion of the fonts are stored in the B register 258. Thus, AND gate 292 (FIG. 6b) will be inhibited when the offset bar 2A is used in this mode when any of the codes for the character types A through P; Q through Z etc. are in the B register 258 for comparison with the representations of the characters of the message transferred from the memory 200 to the D register 254. Since gate 292 controls the firing of the print hammers of FIGURE 2 via AND gates 296–1 to 296–64 and flip-flops 298–1 to 298–64 (FIG. 6b), none of the aforementioned characters of the first portion of the fonts can be printed in this mode of operation.

AND gate 43 produces the 128 function signal in response to the NUM signal from flip-flop 404 and the OSN signal from the B decoder 262 (FIGS. 6a and 10). The OSN signal is produced by AND gate 405 (FIG. 10) for each of the sixteen codes having the values 010000 to 011111. These sixteen codes are representative of the sixteen character types in the offset portion of the fonts on the print bar 2A. From FIGURE 9 it can be seen that the sixteen character types φ through 9 $ , . / * and - in the first portion of the font (see for example character types opposite even columns 100 etc. on FIGURE 9) are identical to the sixteen character types in the offset portion of the fonts (i.e. those character types opposite odd columns 35 to 65). The codes for these sixteen character types in the first portion of fonts have binary values which range from 110000 to 111111. From the foregoing it can be seen that the codes for these two sets of character types vary only in the sixth bit position. That is, the codes for the offset character types φ to have a "0" bit in the sixth position and the codes for the character types φ to - in the first portion of the font have a "1" bit in this position. However, the representation of these characters φ to - must be constant in memory 200. Arbitrarily the codes 110000 to 111111 represent these characters φ to - at the output of the translator 212 (FIG. 6a).

The 128 function signal is applied to inhibit AND gate 264–6 (FIG. 6b) which transmits the sixth bit of the ones complement of the character type representation in the B register 258 to the adder 302 via OR gate 268. The ones complement of values representative of the offset character types φ to - have a "1" bit in the sixth position and the ones complement of the values representative of the character types φ to - from the first portion of the fonts has a "0" bit in that position. The 128 function signal applied to AND gate 264–6 prevents the "1" bit in the sixth bit position of complemented codes for the offset character types from being transmitted to the adder 302 and instead causes a "0" bit to be transmitted in this position. Therefore, the 128 function signal converts all the codes representative of the character types φ to - from the offset portion of the fonts into codes which are identical for similar character types in the first portion of the fonts. Accordingly, representations for characters φ through - from the message stored in memory 200 as they appear in the D register 254 may be compared with representations of character types φ to - from either portion of the print bar 2A. This conversion is necessary since a character of the message may be printed in a column of the record 8 by either the character types from the offset portion or the first portion of the fonts on print bar 2A.

The operation in this mode is commenced as before, that is, in response to a print order applied to the input of AND gate 104 (FIG. 4). When the turnaround signal (FIG. 4) is produced, print flip-flop 106 (FIG. 4) is set which in turn applies a signal via AND gate 108 to set the scan flip-flop 112. Each sprocket detected by one of the read heads 34 or 35 (FIG. 9) causes the cyclic counter 146 to cycle 64 times. As before in each cycle, 64 memory locations are addressed and the contents thereof are compared with the representations of the character types approaching various column positions of the record 8. The addressing of the memory and the generation of the codes representing character types on the print bar 2A are controlled by the function signals previously described in connection with FIGURES 7 and 8.

From the description given in connection with FIGURE 8 it will be appreciated that both odd and even locations in the memory 200 will be addressed after each sprocket is detected, notwithstanding the direction of movement of the print bar 2A. Further it will be understood that characters from even locations in the memory 200 will be compared with the representations of character types approaching even columns of the record 8 and characters from the odd locations will be compared with representations of character types approaching odd columns on the record 8. Whenever comparison is obtained an appropriate one of the flip-flops 298–1 etc. is set. The next sprocket detected causes a new memory scan and a fire pulse to be produced by gate 118 which resets those flip-flops 298–1 etc. which have been previously set. The flip-flops 298–1 etc., which have been reset, operate selected print hammers (FIG. 2) and printing takes place in both the odd and even columns of the record 8. Since printing in even and odd columns of the record 8 occurs after each sprocket is detected, the entire line is printed in one sweep of the print bar 2A, that is after the print bar 2A has completely moved left or right. Accordingly, the printing of a line of a message comprising the characters φ to - can be done at twice the rate for printing a line of a message which includes alphabetic characters. More generally the printing of this selected group of characters from the offset portion of the print bar 2A and the corresponding characters from the first portion of the font can be done at twice the rate for printing characters which appear only in the first portion of the font on print bar 2A or which appear on the first or standard print bar 2 (FIG. 3).

The print operation is ended in this mode after one sweep of the print bar 2A. To this end the NUM signal from flip-flop 404 is applied via OR gate 121 to the set input of flip-flop 122 (FIG. 4). The NUM signal is applied at the beginning of the print operation prior to the generation of the turnaround signal (TA) by the resettable delay flop 96 (FIG. 4). When the last scan of the memory 200 is to take place, either the LC or FC signal from the B decoder 262 will be generated. In particular if the print bar 2A is moving left, the representation of the symbol - (last character in the font) will be stored in the B register 258 when the counter 146 is at a count of C1 in the cycle of operation immediately after the detection of sprocket S65 by head 34 (FIG. 9) .At this time the bar 2A has almost completed its leftward motion and gate 95 (FIG. 4) which is operated by the LC signal transmits a signal via OR gate 97 to reset the run flip-flop 91. The $\overline{\text{run}}$ signal produced by flip-flop 91 in response to a reset input is applied to condition AND gate 120 (FIG. 4). The next sprocket to be detected, i.e. sprocket S66, causes a signal to be transmitted from amplifier 82 (FIG. 4) to another input of AND gate 120 via elements 100, 102 and trailing edge detector 114. This signal is passed through gate 120 to the input of AND gate 140 which is conditioned by the set output of flip-flop 122. AND gate 140 transmits a pulse to reset flip-flop 106 (FIG. 4) and end the print operation. However, if the print bar 2A is moving right the character representation for the character type A (first character in the font on print bar 2A - FIG. 9) will be stored in the B register 258 when the counter 146 is at a count of C1 in the cycle immediately after the detection of sprocket S2 by read head 35. At this time the print bar 2A has almost completed its rightward motion and gate 93 will transmit a signal via OR gate 97 to reset the run flip-flop 91. The $\overline{\text{run}}$ signal produced by flip-flop 91 is applied to condition AND gate 120 (FIG. 4). The next sprocket detected, i.e. sprocket S1, causes a signal to be transmitted from amplifier 80 to the input of gate 120 via elements 98, 102 and 114. This signal is passed through AND gate 120 to the input of AND gate 140 which as noted before is conditioned by the set output of the flip-flop 122 as soon as the print operation is started. Again AND gate 140 transmits a pulse to reset the print flip-flop 106 and ends the operation after the print bar has swept across the record 8 only once.

The embodiments of the invention in which an exclusive property or privilege is claimed are defined as follows:

1. In a device for printing characters upon a record having a plurality of character receiving columns the combination comprising a type carrier adapted to translate character types arranged in groups across the columns of said record in a line, wherein each character type on said carrier is separated from an adjacent character type by at least the width of one of the character receiving columns of the record, a first group of character types are disposed in a first predetermined columnar arrangement with respect to said record and a second group of character types are disposed in a second predetermined columnar arrangement with respect to said record during a first interval of time and said first group of character types are disposed in said second predetermined columnar arrangement with respect to said record when said second group of character types are disposed in said first predetermined columnar arrangement with respect to said record during another interval of time.

2. Apparatus for printing characters in columns on a record including a type carrier and means for moving said type carrier orthogonally with respect to the columns of a record, said carrier comprising an elongated member having a single line of character types arranged in groups positioned along the length of said carrier so that between said character types in each of the groups there is a first space having a predetermined area and between adjacent character delineating separate groups on said carrier there is a second space having a predetermined length which is substantially an integral number of times the area of said first space.

3. The apparatus defined in claim 2 wherein said first space is substantially equal to that required for printing a character on a record and said second space is substantially equal to that required for printing two adjacent characters on said record.

4. The apparatus defined in claim 1 wherein each group of character types includes a plurality of different types distributed in a line wherein character types in the first group of the set are adjacent one another and character types of the second group of the set are adjacent one another.

5. The apparatus defined in claim 4 wherein the character types of one of the groups of the set are distributed on either side of the character types of the other group on said type bearing means.

6. In an apparatus for printing a plurality of characters in a plurality of character spaces across the width of a record, a print means comprising: type bearing means mounted for movement across said character spaces, said type bearing means having a plurality of groups of character types disposed on a surface thereof, wherein each character type on said carrier is separated from an adjacent character type by at least the width of one of the character receiving columns of the record, a first group of character types are disposed in a first predetermined columnar arrangement with respect to said record and a second group of character types are disposed in a second predetermined columnar arrangement with respect to said record during a first interval of time and said first group of character types are disposed in said second predetermined columnar arrangement with respect to said record when said second group of character types are disposed in said first predetermined columnar arrangement with respect to said record during another interval of time, drive means coupled to said type bearing means to move said type bearing means alternately in a first and second direction across said character spaces; a plurality of selectively operable print hammer means, corresponding in number to one-half of said character spaces, each print hammer means being disposed adjacent the interspace between adjacent ones of said character spaces and having a print hammer face capable of spanning the two character spaces adjacent thereto; and selection means coupled to said print hammer means to selectively operate said print hammer means when a desired character type is aligned with a desired character space whereby said record means is imprinted by said desired character type at the desired character space in response to the operation of said print hammer.

7. The apparatus defined in claim 6 further including means controlled by said type bearing means and coupled to said selection means for rendering said selection means operable at selected times to operate said print hammer means when said first group of the character types on said type bearing means are disposed in said first predetermined columnar arrangement with respect to said record, said second group of character types on said type bearing means are disposed in said second predetermined columnar arrangement with respect to said record and said type bearing means is moved across said character spaces in a first direction and to operate selected ones of said print hammer means when said first group of the character types are disposed in said second predetermined columnar arrangement, said second group of said character types are disposed in said first predetermined columnar arrangement and said type bearing means is moved across said character spaces in a second direction.

8. Apparatus for printing characters in columns on a record including a type carrier and means for moving said type carrier orthogonally with respect to the columns of a record, said carrier comprising an elongated member having a single line of character types arranged in groups positioned along the length of said carrier so that between said character types in each of the groups there is a first space having a predetermined area and between the last character type of one group and the first character type of the next adjacent group on said carrier there is a second space having a predetermined area which is substantially an integral number of times the area of said first space.

References Cited

UNITED STATES PATENTS

| | | | |
|---|---|---|---|
| 2,874,634 | 2/1959 | Hense | 101—93 |
| 2,936,704 | 6/1960 | Hense | 101—93 |
| 2,993,437 | 7/1961 | Demar et al. | 101—93 |
| 3,007,399 | 11/1961 | Sasaki et al. | 101—93 |
| 3,048,330 | 8/1962 | Hense | 235—151.22 |
| 3,066,601 | 12/1962 | Edon | 101—93 |
| 3,099,206 | 7/1963 | Hense | 101—93 |
| 3,128,693 | 4/1964 | Thiemann | 101—93 |
| 3,209,682 | 10/1965 | Cooper et al. | 101—93 |
| 3,212,435 | 10/1965 | Walker | 101—93 |
| 3,220,343 | 11/1965 | Wilkens et al. | 101—93 |
| 3,282,204 | 11/1966 | Cere | 101—93 |
| 3,282,205 | 11/1966 | Cogar | 101—93 |

WILLIAM B. PENN, *Primary Examiner.*